(12) United States Patent (10) Patent No.: US 7,565,003 B2
Ashizaki et al. (45) Date of Patent: Jul. 21, 2009

(54) IMAGE PROCESSING APPARATUS AND METHOD, PRINTED MATTER PRODUCTION APPARATUS AND METHOD, AND PRINTED MATTER PRODUCTION SYSTEM

(75) Inventors: Koji Ashizaki, Tokyo (JP); Takahiro Toyoda, Tokyo (JP); Akira Shirakura, Tokyo (JP)

(73) Assignee: Sony Corporation (JP)

( * ) Notice: Subject to any disclaimer, the term of this patent is extended or adjusted under 35 U.S.C. 154(b) by 677 days.

(21) Appl. No.: 10/387,109

(22) Filed: Mar. 12, 2003

(65) Prior Publication Data

US 2003/0210461 A1 Nov. 13, 2003

(30) Foreign Application Priority Data

Mar. 15, 2002 (JP) ............................ P2002-071420

(51) Int. Cl.
*G06K 9/00* (2006.01)
*H04N 7/14* (2006.01)
*H04N 5/89* (2006.01)
*G03H 1/00* (2006.01)
*G03H 1/26* (2006.01)

(52) U.S. Cl. .................... 382/154; 348/14.16; 348/40; 348/42; 348/51; 359/1; 359/23; 359/378

(58) Field of Classification Search ................. 382/154; 348/14.16, 40, 42, 51; 359/1, 2, 23, 378
See application file for complete search history.

(56) References Cited

U.S. PATENT DOCUMENTS 5,059,771 A * 10/1991 Ip et al. ...................... 235/64.7

5,473,364 A 12/1995 Burt (Continued)

FOREIGN PATENT DOCUMENTS

EP 816952 A2 * 1/1998

(Continued)

OTHER PUBLICATIONS

King, Yen C., Cheng H. Chuang, and Chung J. Kuo. "Parallax Image Capture System for Stereographic Display": Jun. 1996. Optical Engineering. vol. 35. Issue 6. pp. 1560-1564.*

(Continued)

*Primary Examiner*—Matthew C Bella
*Assistant Examiner*—Manav Seth
(74) *Attorney, Agent, or Firm*—Lerner, David, Littenberg, Krumholz & Mentlik, LLP

(57) ABSTRACT

A method capable of converting motion image data, which is captured in an ordinary way without intending to produce parallax image printed matter, to data that can be printed as parallax image printed matter is provided. The method includes the steps of specifying at least one frame as a reference frame from a plurality of frames constituting the motion image data, and setting a point-of-regard on an object in the reference frame, calculating an amount of movement of the point-of-regard using a relation between the point-of-regard in the reference frame and a point corresponding thereto in another frame, obtaining a motion compensation amount for each frame based on this amount of movement thereof, and executing a motion compensation processing for the motion image data based on the motion compensation amount, thereby converting the motion image data to parallax image data.

32 Claims, 19 Drawing Sheets

U.S. PATENT DOCUMENTS

| | | | |
|---|---|---|---|
| 5,838,360 A * | 11/1998 | Harrold et al. | 347/258 |
| 6,023,356 A * | 2/2000 | Kihara et al. | 359/23 |
| 6,108,440 A * | 8/2000 | Baba et al. | 382/154 |
| 6,118,475 A * | 9/2000 | Iijima et al. | 348/42 |
| 6,192,145 B1 * | 2/2001 | Anandan et al. | 382/154 |
| 6,198,852 B1 * | 3/2001 | Anandan et al. | 382/284 |
| 7,200,261 B2 * | 4/2007 | Ono | 382/154 |
| 2001/0036307 A1 * | 11/2001 | Hanna et al. | 382/154 |
| 2002/0047893 A1 * | 4/2002 | Kremen | 348/40 |

FOREIGN PATENT DOCUMENTS

| | | |
|---|---|---|
| JP | 06-113338 A | 4/1994 |
| JP | 08-191411 A | 7/1996 |
| JP | 10-020754 A | 1/1998 |
| JP | 10-020755 A | 1/1998 |
| JP | 10-501386 A | 2/1998 |
| JP | 2001-142383 A | 5/2001 |
| JP | 2001-249606 A | 9/2001 |
| JP | 2001-521650 A | 11/2001 |
| JP | 2001-337588 A | 12/2001 |

OTHER PUBLICATIONS

Irani, M., P. Anandan, and D. Weinshall. "From Reference Frames to Reference Planes: Multi-View Parallax Geometry and Applications": Jun. 2-6, 1998. Proceedings of the 5th European Conference on Computer Vision.*

* cited by examiner

FIG. 6A
FIG. 6B
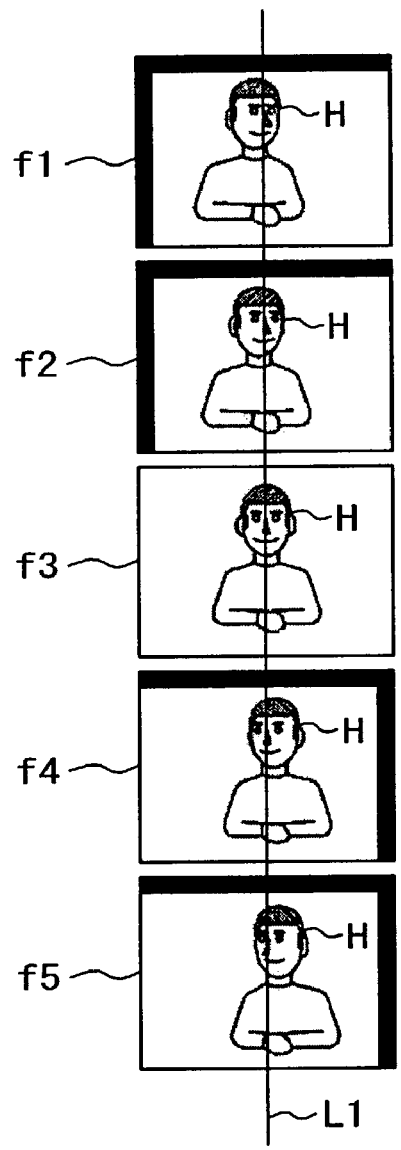
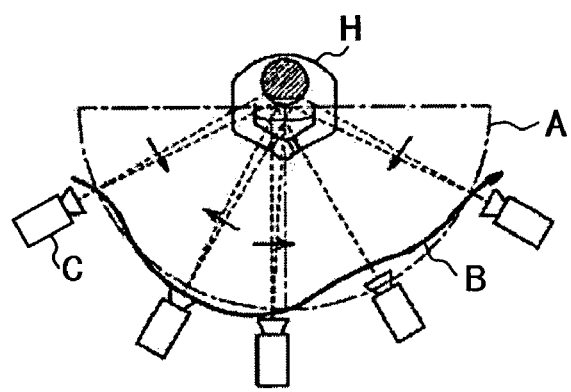

F I G. 7
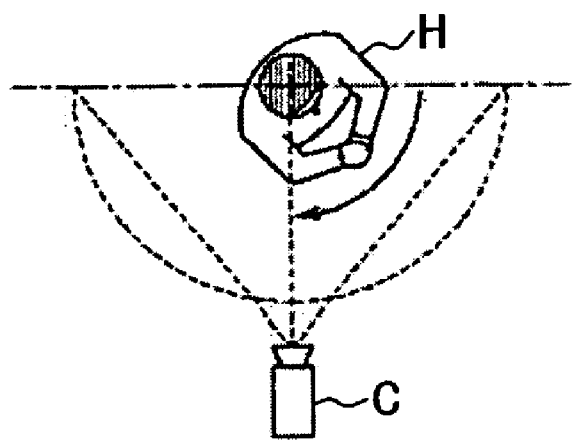
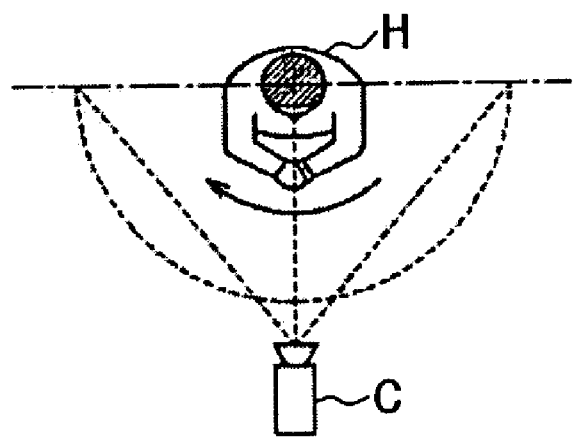
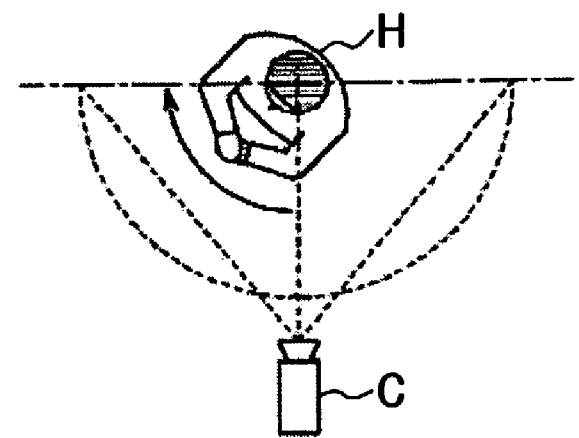

A POINT-OF-REGARD MOVEMENT AMOUNT

MOTION COMPENSATION AMOUNT CALCULATED ON THE BASIS OF THE POINT-OF-REGARD MOVEMENT AMOUNT

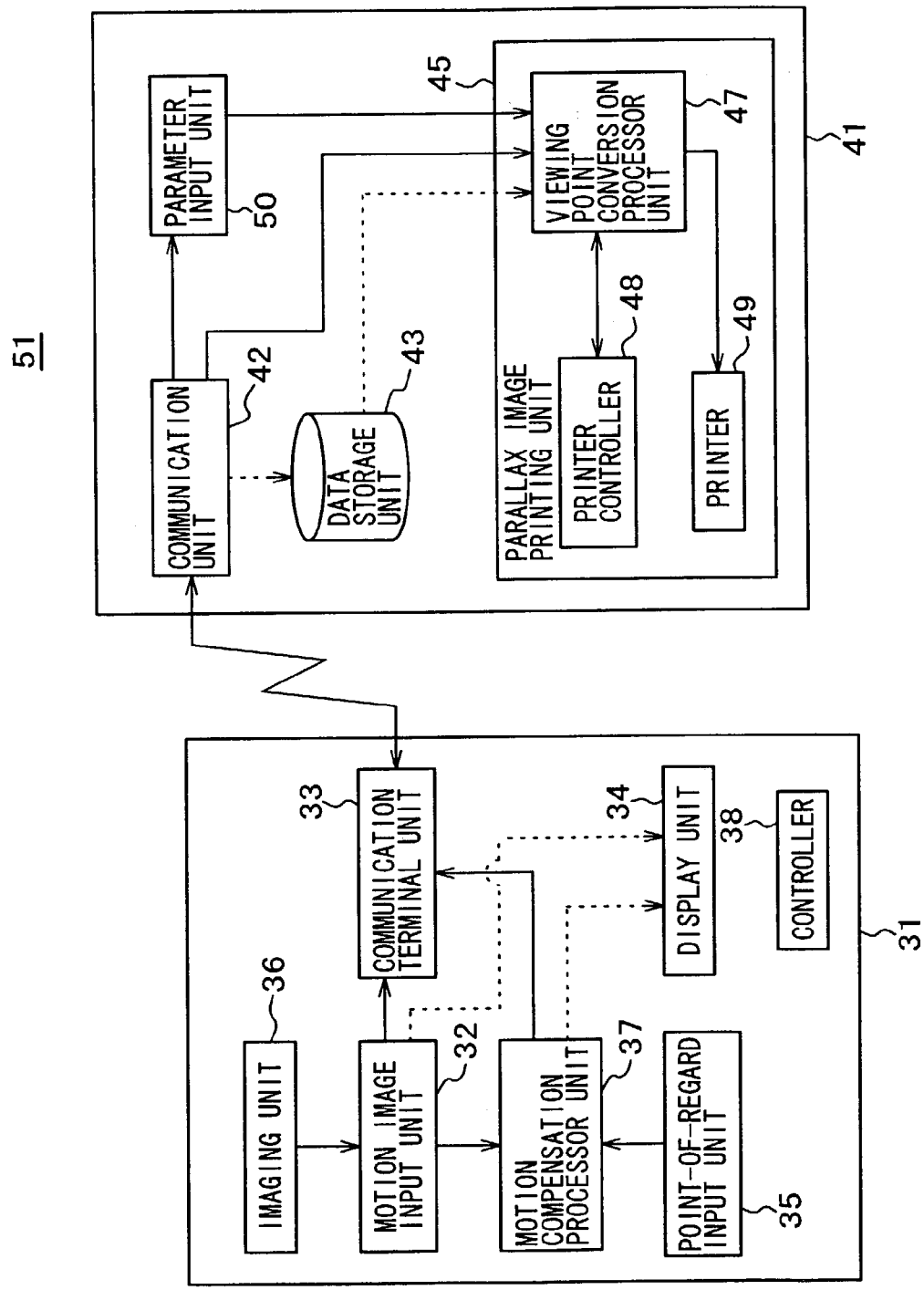

IMAGE PROCESSING APPARATUS AND METHOD, PRINTED MATTER PRODUCTION APPARATUS AND METHOD, AND PRINTED MATTER PRODUCTION SYSTEM

CROSS REFERENCES TO RELATED APPLICATIONS

The present document is based on Japanese Priority Document JP 2002-071420, filed in the Japanese Patent Office on Mar. 15, 2002, the entire contents of which being incorporated herein by reference.

BACKGROUND OF THE INVENTION

1. Field of the Invention

The present invention relates to an image processing apparatus for generating motion image data suitable for a parallax image printed matter and a method thereof, a printed matter production apparatus for printing a parallax image printed matter using motion image data captured in an ordinarily way and a method thereof, a printed matter production system as well as a communication terminal device and a printing device constituting this printed matter production system.

2. Description of Related Art

Recently, due to developments of various types of printing systems, which allow to image-capture and print not only a still image but also motion images and parallax images, a printed matter in which a perceived image changes depending on its viewing direction/angle may be produced. Hereinafter, in the following description of the present invention, this printed matter in which the perceived image would change in accordance with the viewing direction will be referred to as a parallax image printed matter or simply a printed matter according to the present invention.

As examples of business operations currently in service utilizing this parallax image printed matter, there are services for producing a parallax image photograph as a printed matter using the lenticular technology, which include, for example, "Torikiri Konica 3D (Trade Name)" available with a three-eyes-lens equipped film and its print service from Konika Corp.;

"Kodak Snap Kids 3D (Trade Name)" available with a three-eyes-lens equipped film and it print service from Kodak Corp.;

"MIP (Motion Image Print) card (Trade Name)" which synthesizes 6 images, and "Ugoitaro (Trade Name) device for producing this card, both developed by Matsushita Denki Sangyo K. K.;

"Chikyuya K. K.'s Internet Service" for accepting orders for the card produced by the above-mentioned "Ugoitaro" on the internet;

"Motion image card auto vendor" available from Matsushita Denki Sangyo K. K. as an amusement business equipment on order sales, for providing a card containing plural continuous photographs of an object that can be observed as if moving when viewed from a different angle.

Further, as a similar system for producing the parallax image printed matter, there are such ones that produce a printed matter utilizing the holographic technology, which include, for example, "Instant holographic portrait printing system" by Akira Shirakura, Nobuhiro Kihara and Shigeyuki Baba, Proceeding of SPIE, Vol. 3293, pp. 246-253, January 1998; "Fast holographic portrait printing system" by Kihara, Shirakura, Baba, the 3-D Imaging Conference 1998, July 1998, which describes a printing system capable of rendering parallax only in the horizontal direction. In addition to the above, there are other systems for producing a printed matter capable of rendering parallax in both of the horizontal and vertical directions such as "Holographic 3-D printer using the Lipan holographic stereogram proposed" by Yamaguchi, Honda and Ohyama at the $20^{th}$ Imaging Engineering Conference, December, 1989, and "Holographic 3-D printer for high density recording" by Endo, Yamaguchi, Honda, Ohyama, the $23^{rd}$ Imaging Engineering Conference, December, 1992.

In those systems described above for producing parallax images as a printed matter, the printed matter is produced by displaying motion images and/or parallax images, which are of an object to be printed, as if a motion picture, by taking pictures of an object so as to have parallax when viewed from a different viewing point with a dedicated camera, or by generating images having parallax as viewed from a different viewing point by computer graphics (hereinafter, referred to as CG).

For example, in the case an object is to be imaged with a camera as shown in FIGS. 22(A) and 22(B), conventionally, dedicated equipments and facilities such as a rail 100 having a straight or curved tracks for translation motion of a camera C (FIG. 22(A)), or a camera stage 110 for rotating the camera C mounted thereon (FIG. 22(B)) are required. In this case, the camera is one dedicated for picturing parallax images. Alternatively, there may be an arrangement in which the camera itself is not rotated and an object to be imaged is rotated on a rotating stage. In such an arrangement, a dedicated facility of this rotating stage is required.

In taking of pictures using the above-mentioned rails and the camera stage, its translation motion speed or rotation speed is specified as a preset speed amount or constant speed to be determined as a time variable when taking pictures of the object, and this speed amount is utilized as a parameter for use in an image processing for converting the pictured image into an image suitable for a parallax image printed matter.

Still further, also in the case where the plurality of still images are displayed like a motion picture, imaging of an object using facilities corresponding to the above-mentioned specific equipment such as the rails, the camera stage and the specific camera therefor is prerequisite.

On the other hand, recently, use of digital still cameras and digital video camcorders is pervading widely. Along with this pervasion of these devices, circumstances and conditions have matured for allowing motion images of an object to be inputted into a computer as image data after having been pictured, and to be processed by an image processing.

Not limiting to the image capturing by use of the above-mentioned digital still camera, digital video camcorder or the like, various imaging methods are used for capturing motion images such as the use of a translation motion of a camera moving horizontally relative to an object, circling around the object, and performing a frame-work or camera-work in accordance with a time-variable zooming or a moving object, in order to provide visual impressions of a perspective sense, depth sense or stereoscopic sense to the object and its background images.

In such imaging methods described above, for example, as a basic camera work, there are a panning method in which the camera is panned(rotated) horizontally while fixing its camera position; a tilting method in which the camera is tilted vertically while fixing its camera position; a tracking method in which the camera position is translated in parallel horizontally or vertically; a crane method in which the camera position is moved upward or downward; a dolly or track-up/track-back method in which the object is imaged in a larger or smaller size by moving the camera position back and forth; a zooming method in which the object is pictured by zooming in or zooming out the lens; a tumble method in which the camera position and its direction are moved around the object with a point-of-regard fixed thereon; and the like.

As a typical example of shooting methods of motion images, there is a so-called bullet-time photography or machine-gun photography used in the movie "The Matrix" from the Warner Brothers, started in March 1999 in USA, also in Japan in September 1999 supplied from the Time Warner Entertainment Japan. According to these methods, still cameras in the number of several tens to several hundreds that can be remotely controlled are placed around acting persons to be pictured. Then, while the persons as the object are acting, shutters of these plural numbers of still cameras are operated with a slight time lag therebetween. By use of these pictures imaged as above, changes in the viewing point relative to the object and motion of the acting persons are interlocked, thereby enabling to obtain a motion image that is reproduced like a slow motion image.

In a so-called virtual stereoscopic technology for use of motion images, wherein a processing for enhancing the stereographic visual sense in the motion image obtained by the above-mentioned imaging method is applied by using a picture image processing, computer graphic processing or the like, thereby enabling to display a result of the processing as its motion image, several research and developments have been conducted. Such pseudo stereoscopic technologies for use of motion images are disclosed, for example, in Japanese Patent No. 1980-36240 "Stereoscopic image display apparatus", Japanese Patent Application Laid-open 1996-59119 "Virtual stereoscopic image display apparatus", and Japanese Patent Application Laid-open 1996-37303 "Coded image processing method, coded image processing apparatus, and coded image processing circuit", etc.

SUMMARY OF THE INVENTION

The imaging methods and the virtual stereoscopic technologies described above are techniques to be used in such an instance that a motion image is displayed in a time series as they are pictured. In contrast to the above, if the motion images are to be displayed in space domain and varied in accordance with angular directions in the same way as in a parallax image printed matter, and the motion image data pictured in the time series by the above-mentioned method is printed as it is as a parallax image printed matter, image content thereof would appear moving too much or trembling thereby making it difficult to find any practical application.

Accordingly, if the motion image is to be displayed spatially as in the parallax image printed matter, the imaging methods described above on the premise of producing the parallax image printed matter using the rail, the rotary stage, specific camera and facilities therefor described above have been used.

However, when an ordinary user takes pictures with a digital still camera or the like, those dedicated camera and equipment specific thereto are not used. Accordingly, in order to render the perspective, depth and stereoscopic visual impressions to the images of the object, it is more usual to use the imaging techniques such as translating the camera transversely or circling around the object while taking the picture, time-varying zooming in/out, framework display in time series in accordance with the motion of the object, and the like. In other words, typically, the pictures are not taken in conscious of producing a parallax image printed matter.

Accordingly, it is desirable to provide a novel image processing apparatus and a method thereof for converting motion image data, which are pictured without any intention to use for producing a parallax image printed matter, to motion image data that is suitable for the parallax image printed matter. Furthermore, it is also desirable to provide a printed matter production apparatus and a method thereof for producing a parallax image printed matter using the motion image data that are pictured in an ordinarily manner. Still furthermore, it is desirable to provide a printed matter production system according to the present invention, and a communication terminal device and a printed matter production device that constitute the printed matter production system.

According to an aspect of the present invention, an image processing apparatus is provided. The image processing apparatus includes: a point-of-regard set-up means for selecting at least one frame as a reference frame from a plurality of frames that constitute motion image data, and setting a point-of-regard on an object in the at least one frame selected as the reference frame; and a motion compensation processing means for calculating an amount of movement of the point-of-regard using a relation between the point-of-regard in the reference frame set up by the point-of-regard set-up means and a point corresponding thereto in another frame, calculating a motion compensation amount for each frame based on the amount of movement of the point-of-regard, and executing a motion compensation processing for the motion image data on the basis of the motion compensation amount, thereby converting the motion image data into parallax image data from which a parallax image printed matter can be printed in which an image to be perceived varies depending on its viewing directions.

An image processing method according to another aspect of the present invention includes: a step of specifying at lease one reference frame out of a plurality of frames that constitute motion image data, and setting a point-of-regard on an object in the reference frame; and a step of calculating an amount of movement of the point-of-regard using a relation between the point-of-regard in the reference frame and a point corresponding thereto in another frame, calculating a motion compensation amount for each frame based on the amount of movement thereof, and executing a motion compensation processing for the motion image data on the basis of the motion compensation amount, thus converting the motion image data into parallax image data.

The image processing apparatus and the image processing method according to the present invention described above can convert motion image data, which is pictured by the user in an ordinarily manner without intending to produce a parallax image printed matter, to parallax image data suitable for producing the parallax image printed matter. Therefore, according to the present invention, without the need of any specific or dedicated camera and equipment therefor, the motion image data that is suitable for the parallax image printed matter can be obtained easily.

An image processing apparatus according to another aspect of the present invention includes: a point-of-regard setting means for specifying at least one reference frame from a plurality of frames that constitute motion image data, and setting a point-of-regard on an object in the reference frame; a motion compensation amount calculation means for calculating an amount of movement of the point-of-regard using a relation between the point-of-regard in the reference frame set up by the point-of-regard setting means and a point corresponding thereto in another frame, and calculating a motion compensation amount for each frame on the basis of the amount of movement thereof; and an image conversion processing means for generating a parameter for use in image conversion, to which the motion compensation amount calculated by the motion compensation amount calculation means is added, thereby converting the motion image data into data that can be printed as a parallax image printed matter on the basis of the parameter.

Further, an image processing method according to still another aspect of the present invention includes: a step of selecting at least one frame as a reference from a plurality of frames that constitute motion image data, and setting a point-of-regard on an object in the reference frame; a step of calculating an amount of movement of the point-of-regard using a relation between the point-of-regard in the reference frame and a point corresponding thereto in another frame, and calculating a motion compensation amount for each frame on the basis of the amount of movement thereof; and a step of generating a parameter for use in an image conversion, to which the motion compensation amount is added, thereby converting the motion image data into data which can be printed as a parallax image printed matter on the basis of the parameter.

The image processing apparatus and the image processing method according to the present invention described above can convert the motion image data, which is taken by the user in an ordinarily manner, i.e., without intending to produce a parallax image printed matter, to data of the motion image that can be printed as a parallax image printed matter. Therefore, according to the present invention, without the need of any specific camera and equipment therefor, the motion image data that is suitable for a parallax image printed matter can be obtained easily.

A printed matter production apparatus according to still another aspect of the present invention includes: a point-of-regard setting means for selecting at least one frame as a reference frame from a plurality of frames that constitute motion image data, and setting a point-of-regard on an object in the reference frame; a motion compensation means for calculating an amount of movement of the point-of-regard using a relation between the point-of-regard in the reference frame and a point corresponding thereto in another frame, calculating a motion compensation amount for each frame on the basis of the amount of movement thereof, and executing a motion compensation processing for the motion image data on the basis of the motion compensation amount, thereby converting the motion image data to parallax image data which can be printed as a parallax image printed matter in which a perceived image varies depending on its viewing directions; and a printing means for printing a parallax image printed matter based on the parallax image data.

A printed matter production method according to still another aspect of the present invention includes: a step of selecting at least one frame as a reference frame from a plurality of frames that constitute motion image data, and setting a point-of-regard on an object in the reference frame; a step of calculating an amount of movement of the point-of-regard using a relation between the point-of-regard in the reference frame and a point corresponding thereto in another frame, calculating a motion compensation amount for each frame based on the amount of movement thereof, and executing a motion compensation processing for the motion image data in accordance with the motion compensation amount, thereby converting the motion image data to parallax image data that can be printed as a parallax image printed matter in which a perceived image varies depending on its viewing angle; and a step of printing a parallax image printed matter based on the parallax image data.

A printed matter production apparatus according to still another aspect of the present invention includes: a point-of-regard setting means for selecting at least one frame as a reference frame from a plurality of frames that constitute motion image data, and setting a point-of-regard on an object in the reference frame; a motion compensation amount calculation means for calculating an amount of movement of the point-of-regard using a relation between the point-of-regard in the reference frame and a point corresponding thereto in another frame, and calculating a motion compensation amount for each frame based on the amount of movement thereof; an image conversion processing means for generating a parameter for use in an image conversion, to which the motion compensation amount calculated by the motion compensation amount calculation means is added, thereby converting the motion image data on the basis of the parameter to data that can be printed as a parallax image printed matter; and a printing means for printing the parallax image printed matter in accordance with the data having been converted.

A printed matter production method according to still another aspect of the present invention includes: a step of selecting at least one frame as a reference frame from a plurality of frames that constitute motion image data, and setting a point-of-regard on an object in the reference frame; a step of calculating an amount of movement of the point-of-regard using a relation between the point-of-regard in the reference frame and a point corresponding thereto in another frame, and calculating a motion compensation amount for each frame in accordance with the amount of movement thereof; a step of generating a parameter for use in image conversion, to which the motion compensation amount is added, thereby converting the motion image data using the parameter to data that can be printed as a parallax image printed matter; and a step of printing a parallax image printed matter using the data having been converted.

A printed matter production system according to still further aspect of the present invention includes: a communication terminal unit which includes a motion image input means for inputting motion image data, a point-of-regard setting means for specifying at least one frame as a reference frame from a plurality of frames that constitute the motion image data, and setting a point-of-regard on an object in the reference frame, and a first communication means for transmitting data relating to the motion image data and the point-of-regard. The printed matter production system further includes a printing unit which includes a second communication means for receiving the data from the first communication means, a motion compensation means for calculating an amount of movement of the point-of-regard using a relation between the point-of-regard in the reference frame and a point corresponding thereto in another frame, calculating a motion compensation amount for each frame based on the amount of movement thereof, and executing a motion compensation processing for the motion image data based on the motion compensation amount, thereby converting the motion image data to parallax image data that can be printed as a parallax image printed matter in which a perceived image varies depending on its viewing angle; and a printing means for printing a parallax image printed matter in accordance with the parallax image data.

Further, a printed matter production system according to still another aspect of the present invention includes: a communication terminal unit which includes a motion image input means for inputting a motion image; a point-of-regard setting means for specifying at least one frame as a reference frame from a plurality of frames that constitute the motion image data, and setting a point-of-regard on an object in the reference frame, a motion compensation processing means for calculating an amount of movement of the point-of-regard using a relation between the point-of-regard in the reference frame and a point corresponding thereto in another frame, calculating a motion compensation amount for each frame based on the amount of movement thereof, and executing a motion compensation processing for the motion image data based on the motion compensation amount, thereby converting the motion image data to parallax image data that can be printed as a parallax image printed matter in which a perceived image varies depending on its viewing angle, and a first communication means for transmitting data relating to the motion image data. The printed matter production system further includes a printing unit which includes a second communication means for receiving the data from the first communication means, and a printing device for printing a parallax image printed matter based on the data relating to the motion image data from the first communication means.

According to the printed matter production apparatus, the printed matter production method, the printed matter production system, and the information terminal unit and the printing unit for constituting this system of the present invention described above, it is easily implemented to produce the parallax image printed matter by applying the image processing method described above. Therefore, according to the present invention, advantageously, various parallax image printed matters can be produced from the motion image data that have been taken normally by the user, thereby enabling easily to obtain a parallax image printed matter such as a holographic stereogram or the like having highly entertaining features.

BRIEF DESCRIPTION OF THE DRAWINGS

The above and other objects, features and advantages of the present invention will become more apparent from the following description of the presently preferred exemplary embodiment of the present invention taken in conjunction with the accompanying drawings, in which:

FIG. 6(a) is a diagram showing conditions of frames of the motion image data after subjected to a motion compensation processing, and FIG. 6(b) is a diagram indicating positions of cameras capable of imaging the motion image data same as that after the motion compensation processing;

FIG. 7 is a diagram showing an example of another typical imaging method for capturing motion image data;

FIG. 21 is a block diagram indicating a schematic arrangement of a printed matter production system having still more another configuration.

DESCRIPTION OF PREFERRED EMBODIMENT

The present invention is contemplated to enable production of a parallax image printed matter utilizing motion image data pictured ordinarily way (hereinafter referred to as an ordinary or normal motion image data) with an ordinary video camera, not on the premise that a parallax image printed matter is to be produced, and without using any specific or dedicated camera, imaging stage and facilities designed specific thereto. By referring to the accompanying drawings, a preferred embodiment of the present invention will be described in detail in the following. By way of example, the normal or ordinary motion image data used in the description of the present invention is intended to mean a broader term of motion image data including not only a narrower term of motion image data defined to have a frame rate of 30 frames or so, but also a pseudo motion image data defined to have a frame rate of 15 frames and a still image data having a plurality of consecutive images. Further, in the following description, a parallax image printed matter is described as one which can produce a holographic stereogram, and motion image data suitable for the parallax image printed matter (hereinafter referred to as parallax image data) is described as the image data that can be exposed and printed as a holographic stereogram.

Figure 1:
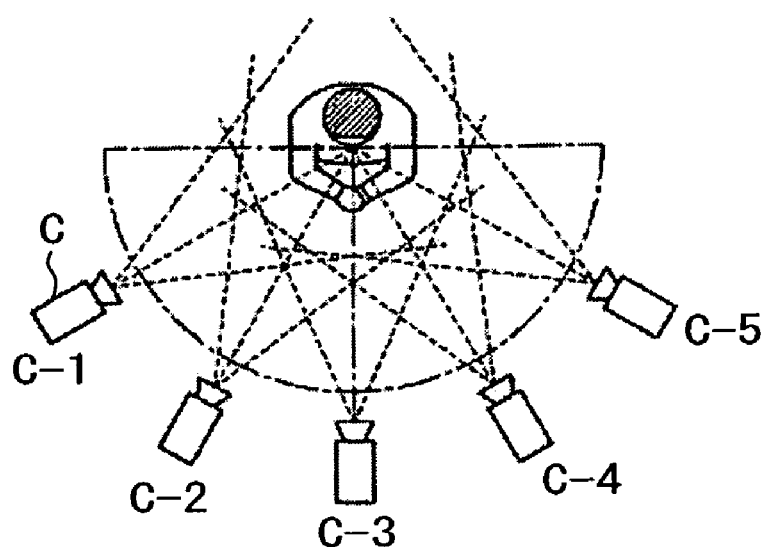
FIG. 1 is a drawing indicative of a typical imaging method for obtaining parallax image data.

First of all, a typical exemplary imaging method for generating motion image data for use in the production of a holographic stereogram as a parallax image printed matter will be described. In a conventional parallax image data generation method performed on the premise that dedicated facilities, cameras and the like designed specific thereto are used, as shown in FIG. 1, the image data is generated by translating a camera C along a circular track and imaging an object at camera positions C-1 to C-5. Then, in order for the parallax image data thus generated to be recorded as a parallax image printed matter, a conversion processing therefor such as viewing point conversion and the like is executed in accordance with a geometrical and spatial relations at the time of exposure and printing thereof which are to be determined depending on a respective method of producing the parallax image printed matter with respect to a reproduced image to be displayed. Therefore, motion image data having been subjected to this conversion processing is recorded as the parallax image printed matter.

Figure 2:
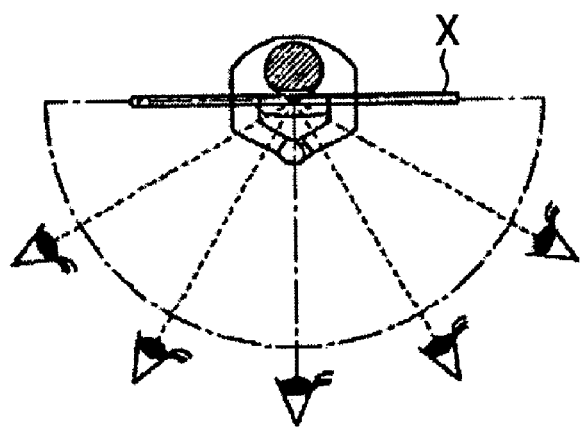
FIG. 2 is a drawing indicating positions of a reproduced image displayed by the parallax image printed matter.

Generally, the position of a reproduced image to be displayed in a parallax image printed matter is disposed in most cases as shown in FIG. 2 with the plane of a parallax image printed matter as its center, and portions of the image displayed in the back and front scenes of the plane of the parallax image printed matter X render a depth (perspective) sense. Such disposition of scenes of the reproduced image is expressed as "A displayed scene of image is constantly positioned on the plane" in the field of the parallax image printed matter.

Now, as for this parallax image data taken on the premise to produce a parallax image printed matter, let's consider how to constantly position a particular point of an object to be reproduced on the plane of the parallax image printed matter.

For example, if it is consider that an instance of imaging an object with a camera C traveling along a circular arc track as shown in FIG. 1, a plane of a parallax image printed matter is assumed to reside on a linear line that contains the center of this circular arc. Then, in the imaging method shown in FIG. 1, images are taken with the camera while keeping equidistance from the center of this circular arc, traveling along the track and thus changing its viewing angle. In the motion image data taken as described above, a pixel at a position corresponding to the center of the circular arc is assumed to have been imaged aiming at a particular point in an object, that is, aiming at the center point of the circular arc, and changing its viewing angle.

Therefore, if a specific imaging condition is created for the motion image data in such a way that a specific point on an object is aimed, the same pixel position (distance) is imaged while changing its viewing angle, this specific point can be constantly positioned on the plane of the parallax image printed matter.

That is, if a specific point is set on an object as a point-of-regard, and if this point-of-regard set on the object is ensured to be positioned constantly at the same pixel position, it becomes possible to convert any ordinary motion image data to parallax image data suitable for a parallax image printed matter, in which an image to be displayed can be constantly positioned in the plane of the parallax image printed matter.

Therefore, according to an embodiment of the present invention, in order to be able to constantly position a reproduced image on the surface of the parallax image printed matter, by arranging in such a way that the point-of-regard set on the object is retained at the constant pixel position as described above, the ordinary motion image data is converted to the parallax image data. This conversion processing will be described below.

Figure 3:
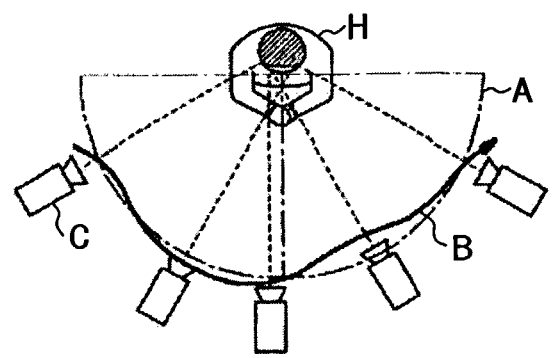
FIG. 3 is a drawing indicating an example of typical imaging modes of taking motion image data.
Figure 4:
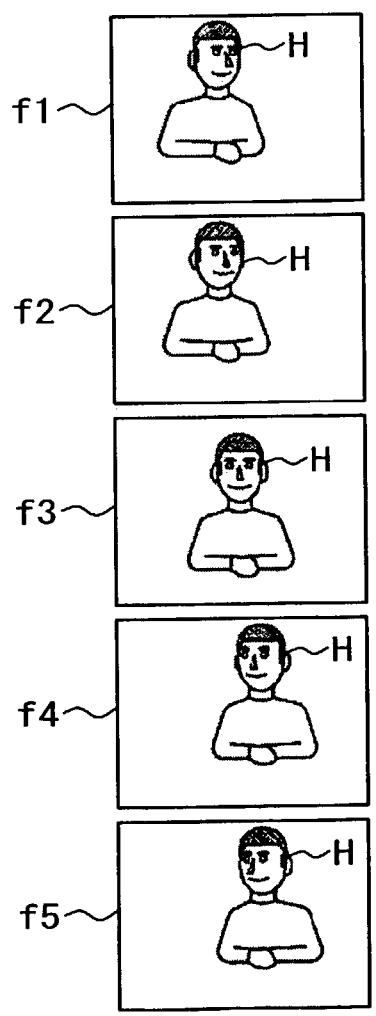
FIG. 4 is a diagram showing parts of frames of the motion image data taken by the typical imaging mode of FIG. 3.

First, ordinary motion image data is pictured. FIG. 3 shows an example of imaging methods for imaging ordinary motion image data, indicating a state of picturing a person H as an object by moving the position and direction of camera C circularly or tumbling while fixing its point-of-regard thereon. FIG. 4 (f1)-(f5) show portions of frames that constitute the motion image data obtained by the imaging method described above.

In FIG. 3, if the imaging is executed along a dot-and-line circular track A, because the same condition as in the FIG. 1 is obtained, the conversion processing according to the present invention is not required. On the other hand, if the cameraman tries a tumble imaging as an ordinary motion imaging method, he is likely to move along a track B indicated by a solid line in the same drawing while actually imaging the object. As mentioned above, in a practical imaging, various errors, deviation or irregularity will occur in the speed of movement and the direction of the camera C, more specifically, in the positions of the camera C relative to the person H as the object in the horizontal, vertical and depth directions as well as in the direction of the lens (viewing distance at imaging). Therefore, in the normal motion image data imaged while moving along the track B, the position of the person H in each frame is not constant, not like those in the motion image data suitable as the parallax image data that have been imaged along the track A. In particular, when this imaging is executed with a hand-held type video camera C, motion image data thus obtained, although it may have a dramatic impression when viewed as a motion image displayed in time series, it produces a restless image excessively trembling and thus not suitable as motion image data for use of the parallax image printed matter. Therefore, according to the present invention, in order to be able to convert such ordinary motion image data to the parallax image data, a motion compensation (correction) processing is executed as will be described below.

In the motion compensation processing to be executed for the normal motion image data according to the present invention, a point in an object to be constantly positioned on the plane of the parallax image printed matter, namely, a point-of-regard is set at a particular pixel position in the normal motion image data. This point-of-regard setting is executed by selecting at least one frame as a reference frame from a plurality of frames that constitute the normal motion image data that has been pictured ordinarily, then setting the point-of-regard on an object displayed on the reference frame. In this example, the 60th frame in the normal motion image data made up of 120 frames, which corresponds to frame f3 shown in FIG. 4, is selected as a reference frame, and a root position of the nose of the person H is set as the point-of-regard. By way of example, although the reference frame described above can be selected freely, it is preferable to select a frame that contains the object as large a percent as possible as its reference frame.

By the way, although it is sufficient if the point-of-regard is set in one reference frame, there may occur that the size and/or color information of the object in the image data in the vicinity of the point-of-regard changes substantially due to imaging of the object by changing imaging angles thereof. In such an instance, an error may increase in the measurement of the amount of movement of the point-of-regard (which will be described later), or an erroneous detection may occur. In order to prevent such occurrence, the user, upon confirmation that the point-of-regard is ensured to reside at the same position in the object, may specify two or more reference frames and set each point-of-regard at the same position in the object in each frame.

Figure 5:
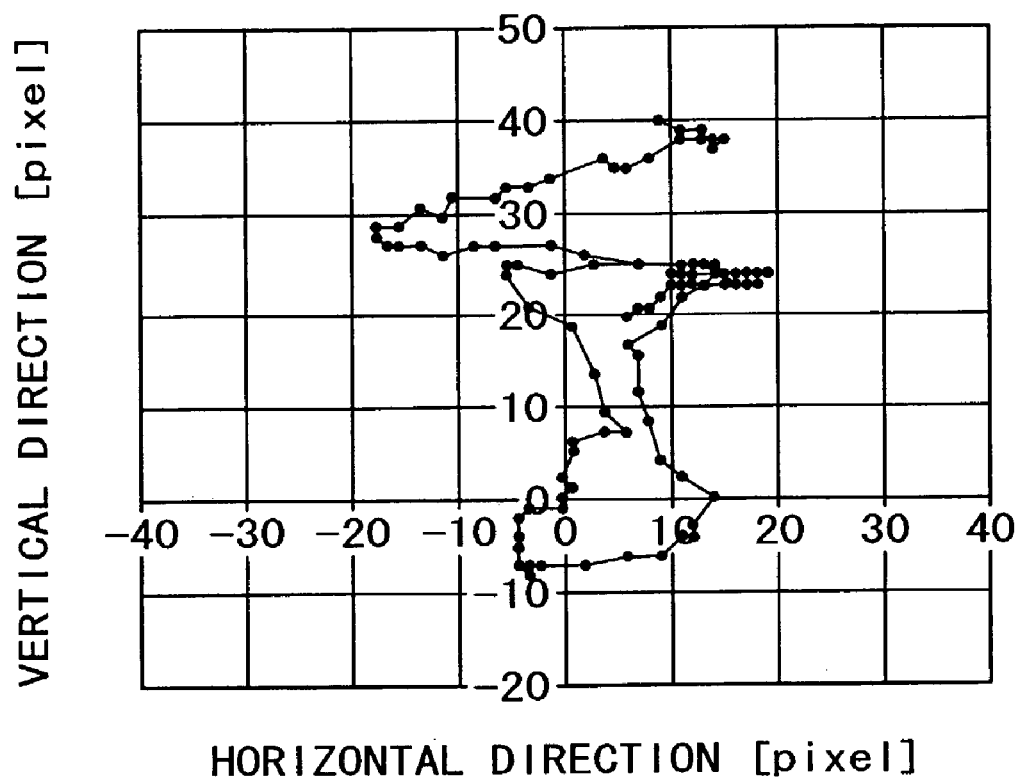
FIG. 5 is a diagram showing amounts of movement of a point-of-regard for the motion image data taken by the same imaging mode.

Then, in the motion compensation processing, after specifying a position at the root of the nose of person H as a point-of-regard, a respective amount of movement of a respective pixel position at the root of the nose displayed on each frame corresponding to the position at the root of the nose displayed as the point-of-regard in the reference frame is calculated for all frames. A result of measurements of the amounts of movement of the points-of-regard according to the present embodiment is shown in FIG. 5. By the way, each amount of movement of the point-of-regard can be measured by executing a correlation processing between respective frames. For this correlation processing between respective frames, such techniques as motion detection or motion compensation operation used in the motion compression processing in MPEG-1 (Moving Picture Experts Group), MPEG-2 or the like, as well as the optical flow detection technique in the computer graphics processing can be used.

FIG. 5 shows a result of detection, which was obtained by the above-mentioned motion detection methods or the like, for the movements of respective points-of-regard in respective frames in the horizontal and vertical directions relative to the point-of-regard in frame f3 in FIG. 4, which is 60$^{th}$ frame and defined as an origin. It is known from FIG. 5 that respective points-of-regard in respective frames are not constantly positioned, and are moved to various positions in response to a speed of the movement and direction of the camera at the time of imaging the object, and changes in the direction of the lens.

Then, in the motion compensation processing, each motion compensation amount is calculated for each frame in accordance with an amount of movement of each point-of-regard calculated above. Using this motion compensation amount, the processing is executed so that the point-of-regard in each frame is positioned at the same coordinates as that of the point-of-regard in the reference frame f3. In the motion compensation processing, in accordance with each motion compensation amount described above, for each image of the object in each frame, i.e. frames f1, f2, f4, f5 and others, a translation motion processing is executed to move in the horizontal and vertical directions. More specifically, in the motion compensation processing, as indicated in FIG. 6a (f1-f5), an image of the object in frame f1 is translated in parallel to the right and downward directions by its motion compensation amount calculated, an image in frame f2 is translated likewise to the right and downward directions by its motion compensation amount calculated, an image in frame f4 is translated likewise to the left and downward directions by its motion compensation amount calculated, and an image in frame 5 is translated likewise to the left and downward directions by its motion compensation amount calculated. By the way, because the frame f3 served as the origin in the coordinates for calculation of respective motion compensation amounts of respective points-of-regard, no translation motion is executed in frame f3. Thereby, in the motion compensation processing, by execution of the translation motion processing in respective frames as described above, all of the respective positions serving as respective points-of-regard at the root of the nose of the person H in respective frames are aligned in the horizontal directions to reside on a reference line L1 indicated in FIG. 6a. Also, with respect to the vertical directions, although no reference line is indicated, they are aligned at the same coordinates in the vertical directions, and as shown in FIG. 8b, respective images are approximated to those images that would have been pictured as if panning the camera C in the directions as indicated by arrows and moving along a circular arc track A, thereby enabling to convert the normal motion image data to the parallax image data. Actually, when a parallax image printed matter is produced using the parallax image data having been subjected to the conversion described above, a good parallax image printed matter which is free of tremble in the image content and has a stereoscopic sense has been obtained.

By the way, generally, in the imaging method executed on the premise that a parallax image printed matter is to be produced, that is, when imaging the object using a dedicated imaging stage, rails and other facilities for rotating or translating in parallel the camera or the object, which are designed specifically therefor, in order to be able to faithfully reproduce a geometrical and spatial relations between a method (condition) of producing a parallax image printed matter such as at the time of exposure/printing and a condition for display and reproduction thereof, a translation motion speed and a rotation speed of the camera and the object are specified carefully while imaging.

On the other hand, in the parallax image data as converted from the normal motion image data in the present invention, a geometrical and spatial relations between a production method of its parallax image printed matter and its display and reproduction condition thereof are not faithful to a relation intended to be realized in the imaging executed on the premise that the parallax image printed matter is to be produced. However, it should be noted that when the user observes any parallax image printed matter, a geometrical and spatial relations between the parallax image printed matter and both eyes of the observer in a relative motion therebetween are not required to be too strict. Therefore, as for the parallax image data converted by the motion compensation processing described above, it is assumed that if a geometric and spatial relations are maintained within a range perceivable by human eyes, a parallax image printed matter from which a reproduced image having a perspective sense, depth perception and stereoscopic sense is observable can be produced.

Further, in order to ensure that the point-of-regard is constantly positioned on the plane of the parallax image printed matter, that is, every point-of-regard in every frame is ensured to be positioned at the same pixel position, it is preferable to execute not only the translation motion processing described above, but also a rotation processing, expansion/reduction processing of the image around the point-of-regard as the center therefor. According to the motion compensation processing of the present invention, by executing these processing jointly with the translation motion processing, adverse effects by unnecessary pan, tilt, track, crane, dolly and the like at the time of imaging, that is, errors and irregularities in the moving speed, moving directions of the camera, and the directions of the lens that hamper the geometric and spatial relations to be ensured at least in the perceptible range by the human eyes in the parallax image printed matter can be minimized.

When executing these rotation processing or expansion/reduction processing, it is preferable further to set a plurality of points-of-regard (hereinafter referred to as auxiliary points-of-regard) in addition to the point-of-regard to be constantly positioned on the plane of the parallax image printed matter (which is simply referred to as the point-of-regard), in order to detect amounts of rotation and expansion/reduction.

For example, in the normal motion image data shown in FIG. 4, if the point-of-regard is set at a position at the root of the nose of person H, the auxiliary point-of-regard is preferably positioned in the vicinity of the plane on which the point-of-regard exists, for example, at the position on the top of the nose, on the forehead or on the shoulder of person H. The reason why the auxiliary point-of-regard is placed at these positions is because that, if the auxiliary point-of-regard exists on a different plane apart from the plane of the point-of-regard, it means that a distance from the imaging camera differs, that is, an apparent size in the image becomes different therebetween, thereby allowing for an error during detection of a rotation amount and expansion/reduction amounts to occur easily.

Figure 8:
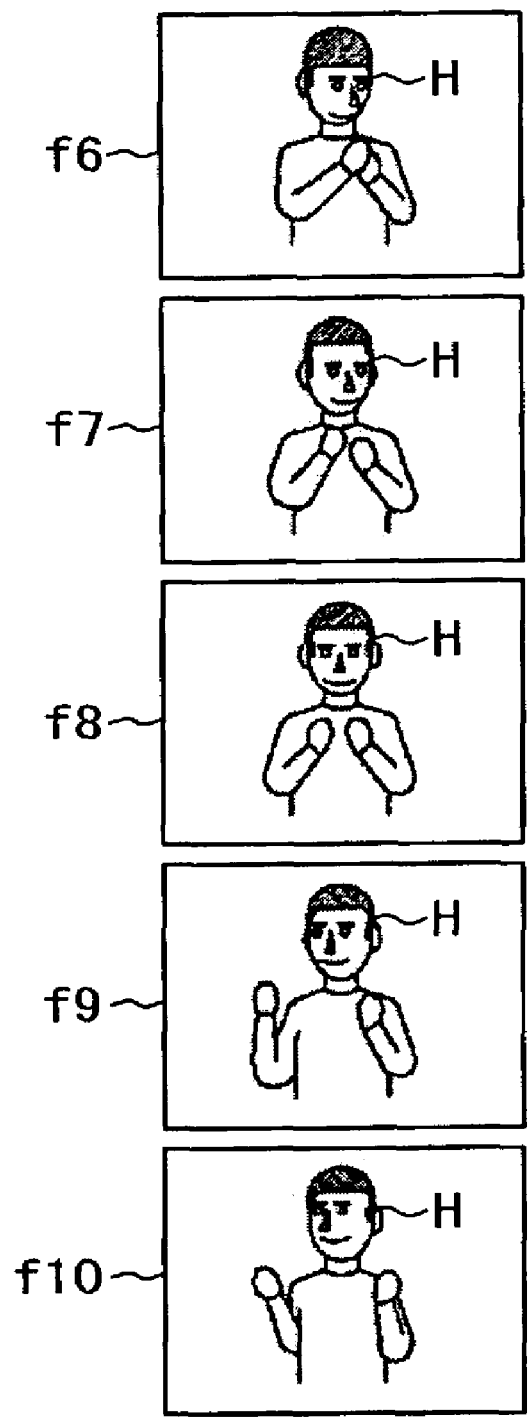
FIG. 8 (f6-f10) show portions of frames of the motion image data taken by the another typical imaging method of FIG. 7.

On the other hand, even in the case where the auxiliary point-of-regard is to be placed at a distant position from the point-of-regard in a picturing image, if the auxiliary point-of-regard is set at a position in the non-parallax direction from the point-of-regard in the parallax image printed matter (i.e., in the vertical direction of the image in FIG. 4); in the vertical direction relative to the moving direction of the imaging camera (i.e., in the vertical direction in FIG. 4); or in the vertical direction relative to the major direction of movement of the point-of-regard (in a vertical direction of the image in an example to be described later with reference to FIG. 8), a distance from the imaging camera tends to become constant, as a result, detection errors at the time of detecting a rotation amount, and expansion/reduction amounts can be minimized.

Further, when the above-mentioned translation motion processing, rotation processing and expansion/reduction processing are executed for each frame that constitutes the motion image data, an area devoid of image information (a black-painted area) results in each frame as shown in FIG. 6 due to the translation motion of the image information within the frame. Therefore, it is preferable to execute a so-called clip processing so as to create a common region in which image information exists for each frame after having executed the translation motion processing, rotation processing, and expansion/reduction processing for the image in each frame. By execution of this clip processing, any adverse effect deteriorating the perspective sense, depth sense and stereoscopic sense in a reproduced image because of the existence of the area devoid of image information when the user observes the parallax image printed matter can be minimized. Further, according to the present invention, because an expansion processing is executed for restoring a size of the area clipped in the clip processing to its original frame size, the size of an object in the parallax image printed matter is displayed relatively large, thereby enabling to obtain a reproduced image which is substantially easier to observe. This clip processing and the expansion processing will be described more in detail. Suppose that as a result of the motion compensation processing such as the translation motion processing, rotation processing, expansion/reduction processing and the like for a normal motion image data having a pixel size, for example, of 640 pixels×480 pixels, an image in the size of 600 pixels×540 pixels is obtained as a common region for the whole frames which are filled with image information. Then, as its clip processing in the motion compensation processing, an image of 600 pixels×540 pixels corresponding to this common region is extracted from each frame. Then, in the motion compensation processing, this image of 600 pixels×540 pixels extracted is applied with an expansion processing to be expanded to the same pixel number of 640 pixels×480 pixels as that prior to the motion compensation processing, using an image processing method such as the bilinear interpolation or bicubic interpolation. Then, in this motion compensation processing, the motion image data obtained as a result of the clip processing and the expansion processing is used in substitution for the motion image data undergone the motion compensation but prior to the clip processing and the expansion processing. In this motion compensation processing, by executing such processing described above, motion image data in which, for example, the face of a person is enlarged than the size of an original motion image data actually imaged can be obtained as parallax image data, therefore, by producing a parallax image printed matter using this parallax image data, a reproduced image which is larger and easier to see can be obtained as well.

By the way, in the exemplary embodiment described above, although the motion compensation processing is executed using the amount of movement of the point-of-regard measured itself as its motion compensation amount, also it may use such a value obtained by a translation motion average processing averaged in the time series direction in each frame with respect to the amount of movement of the point-of-regard, a smoothing process such as polynomial approximation, or approximated curve processing. In the measurement of the amount of movement of the point-of-regard, an error is often contained in the amount of movement thereof in each frame due to a noise in the image or an error in the motion detection processing. On the other hand, because the motion of the point-of-regard in the motion image data is smooth in most cases, by applying the smoothing processing, approximated curve processing or the like to a result of actual measurements, and using a value thus obtained as a motion compensation amount, a more appropriate motion compensation processing can be executed.

In the next, a method for converting a normal motion image data obtained by another imaging method to parallax image data will be described. In this exemplary embodiment, by use of an imaging method described in FIG. 7, more specifically, by imaging person H as an object who turns around by himself toward a fixed camera C, a normal motion image data is obtained. In this instance, even if the camera C is fixed on a tripod or the like, different from the imaging executed on the premise that a parallax image printed matter is to be produced by rotating the object seated on the stage, because the object is moving by himself, a moving speed and/or moving direction of the object are not constant. Thereby, from this motion image data as it is, a good reproduced image cannot be obtained because it is too much moving or restless to be used for a parallax image printed matter. Thereby, in order to constantly position on the plane of the parallax image printed matter, the following motion compensation processing is executed.

Firstly, in this motion compensation processing, a reference frame is selected from a plurality of frames that constitute an ordinary motion image data, then a position at the root of the nose of a person who is an object of imaging is specified as a point-of-regard to be set on the object in the reference frame. Then, in the motion compensation processing, an amount of the movement of a position of a point-of-regard in another frame corresponding to the position of the point-of-regard in the reference frame is measured for respective frames. In this exemplary embodiment, a frame f8 shown in FIG. 8, which corresponds to the 30th frame in motion image data having 60 frames, is defined as the reference frame, and an amount of movement of a point-of-regard in each frame is measured with respect to the position of the point-of-regard set as a reference on person H in the frame f8. A result of the measurements is shown in FIG. 9.

Figure 9:
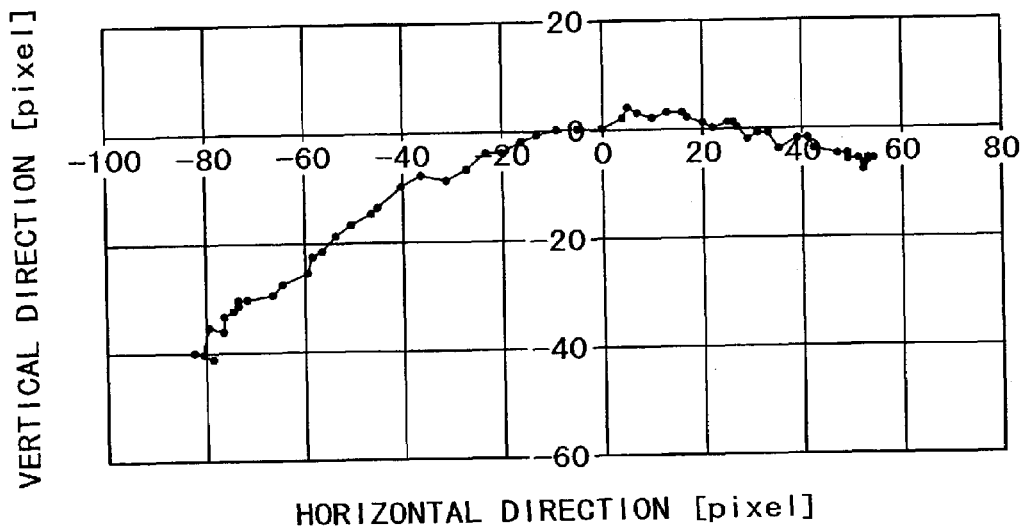
FIG. 9 is a diagram showing amounts of movement of the point-of-regard for the motion image data taken by the same imaging method of FIG. 7.

FIG. 9 shows amounts of movement of respective points-of-regard in other frames in the vertical and horizontal directions relative to the point-of-regard in the 30th frame, i.e., frame f8 in FIG. 8, the position of which is set as an origin in coordinates. It is known from the result of measurements shown in FIG. 9 that respective points-of-regard in respective frames moved minutely in various directions along with its own movement of the object.

Figure 10:
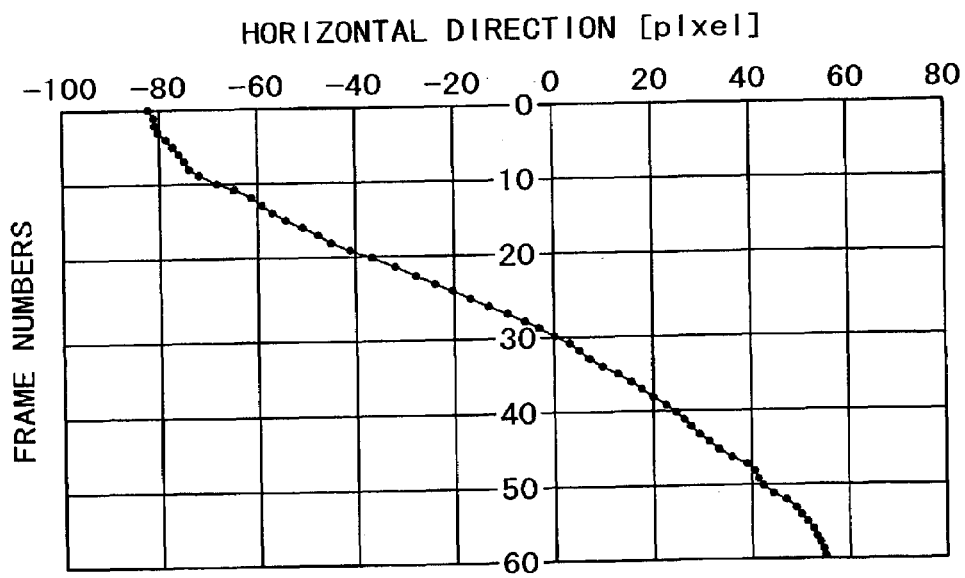
FIG. 10 is a diagram showing components only in the horizontal directions extracted from the amounts of movement of the point-of-regard.

Further, in the motion compensation processing, on the basis of these amounts of movement of respective points-of-regard in respective frames, a processing is executed so that a respective position of a respective point-of-regard in a respective frame is positioned on the same coordinates as the point-of-regard in the frame f8 of the reference. Here, this motion compensation amount is calculated as will be described below. In this embodiment, the object of the person H behaves, other than turning around, to move his head in the vertical direction, i.e., from a face-down state to a face-up state accompanying a time-varying motion. Because this behavior is basically different from the turning around behavior performed by the object for imaging from omni directions in order to obtain parallax image data, and is a part of behaviors of the object performed from his intention or desire, this behavior is desirable to be remained in a reproduced image. Therefore, in this embodiment, a rotation of the object itself, that is, an amount of movement thereof in the horizontal direction is extracted exclusively as a motion of the point-of-regard for the parallax image printed matter, and is used as a motion compensation amount. FIG. 10 is a diagram showing motion compensation amounts that have been obtained by exclusively extracting horizontal components from the amounts of movement of the points-of-regard shown in FIG. 9, and executing a smoothing processing by the translation motion average processing.

Figure 11A:
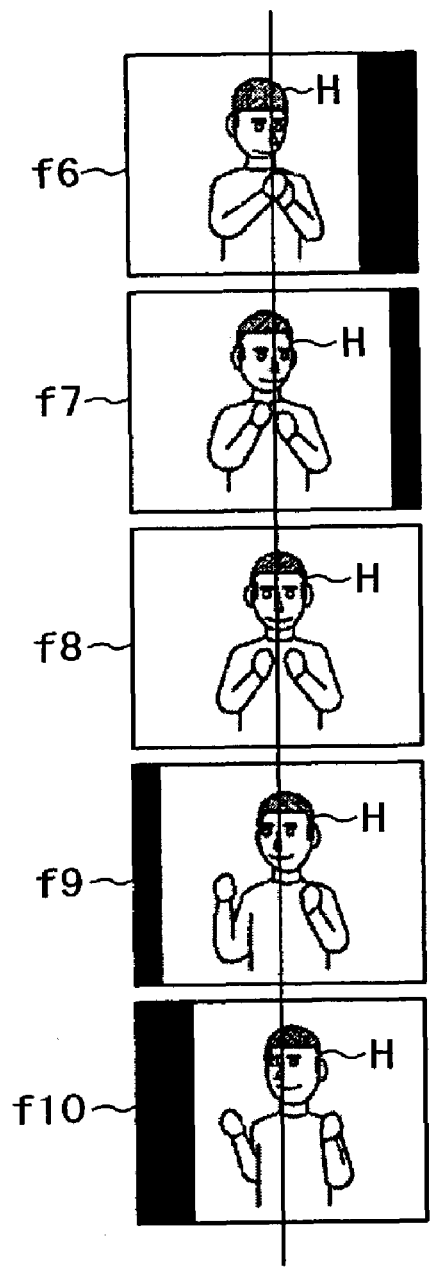
FIG. 11a (f6-f10) show the conditions of frames of the motion image data subjected to the motion compensation processing and FIG. 11(b) is a diagram indicating the camera position capable of imaging the motion image data likewise those applied with the motion compensation processing.
Figure 11B:
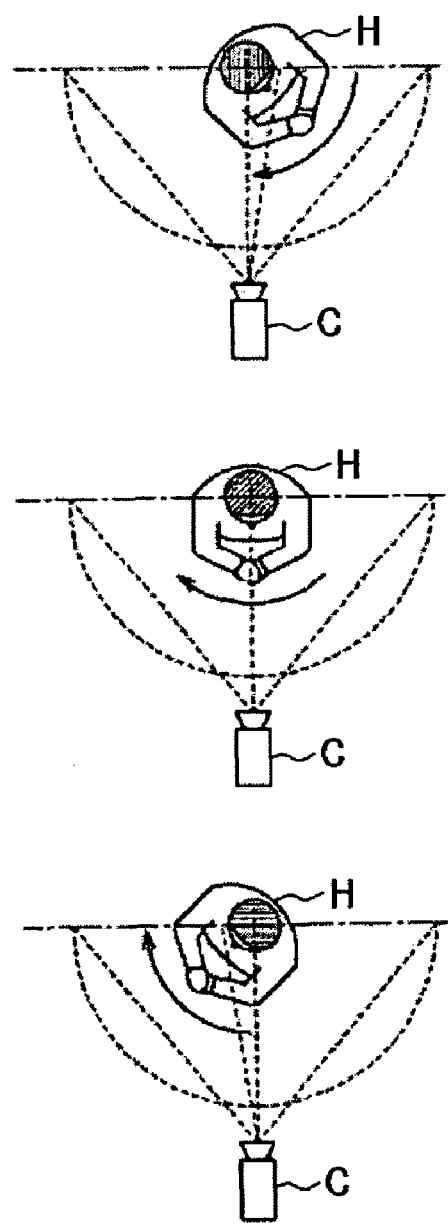

Further, on the basis of the motion compensation amounts shown in FIG. 10 calculated from the amounts of movement of the points-of-regard, respective images in respective frames f6, f7, f9, f10 and other frames other than frame f8 are subjected to the translation motion processing. FIG. 11a (f6-f10) show respective images in respective frames f6, f7, f9, f10 after execution of the translation motion processing. In this embodiment, as described above, because the motion compensation amount is calculated exclusively on the basis of the amount of movement in the horizontal direction, the translation motion is only in the horizontal direction. More specifically, according to this motion compensation processing, the image in frame f6 is moved in parallel to the left-hand side by a motion compensation amount calculated, the image in frame f7 is moved in parallel to the left side by a motion compensation amount calculated, the image in frame 9 is moved in parallel to the right-hand side by a motion compensation amount calculated, and the image in frame f10 is moved in parallel to the right-hand side by a motion compensation amount calculated. By the way, because frame f8 was set as an origin in the calculation of the amounts of movement of the points-of-regard, no translation motion is applied to frame f8. According to this motion compensation processing, by execution of the translation motion processing, respective positions at the root of the nose of person H, which are the points-of-regard in respective frames are aligned all together in the horizontal directions along a reference line L2 as shown in FIG. 11a, that is, they are positioned on the same coordinates, thereby enabling to approximate the image as if pictured by panning the camera C in the directions indicated by arrows and moving along the circular track A while imaging as shown in FIG. 11b, and thereby enabling to convert the normal motion image data to parallax image data. When actually a parallax image printed matter is produced using this parallax image data having been converted as described above, a good parallax image printed matter having a depth perspective and a stereoscopic sense without a blur in image contents due to restless motion has been obtained.

By way of example, when computing a motion compensation amount using the amount of movement of the point-of-regard, it is also possible not only to use horizontal or vertical components extracted from the amounts of movement thereof, but also to use an appropriate function which can approximately display the motion of the object and can be selected from various components in the orthogonal coordinates as well as the polar coordinates thereby converting the amount of movement of the point-of-regard by means of such function conversion. Through execution of such functional conversion, a processing responsive to the contents of the motion image data, i.e., the motion of the object can be executed at the time of converting the amount of movement of the point-of-regard to a motion compensation amount, thereby enabling to obtain an improved parallax image printed matter featuring an enhanced perspective sense, depth sense and stereoscopic sense. For example, because a transition curve of the amounts of movement exclusively of the horizontal components shown in FIG. 10 resembles a cosine function, by converting the transition of the amounts of motion to a cosine function and computing a motion compensation amount, it becomes possible to obtain a good parallax image printed matter having an improved perspective sense, depth sense and stereoscopic sense.

According to the present embodiment as described hereinabove, by executing the motion compensation processing of the present invention to the motion image data, even if this motion image data is a normal motion image data pictured by an ordinary user without intending to produce a parallax image printed matter at all, it can be easily converted to parallax image data suitable for a parallax image printed matter with highly entertaining features.

The parallax image data thus converted from the normal motion image data is converted to a hologram image data, which can be printed as a holographic stereogram after execution of a viewing point conversion processing to be described below, and is used in the production of a parallax image printed matter. A method of producing this parallax image printed matter will be described.

At the time when producing a holographic stereogram as a parallax image printed matter, a predetermined image processing for converting the parallax image data obtained as described above to data that can be printed as a holographic stereogram is executed. In this image processing, a viewing point conversion processing for converting the parallax image data to a hologram image data is executed.

The viewing point conversion processing is for generating an elementary hologram image data that can be actually printed and exposed at an elementary portion and elementary position in a hologram recording medium from the parallax image data that has been imaged with its imaging position and imaging angle fixed so that a geometric and spatial consistency is ensured at the time of reproduction and display of a reproduced image. One of the methods for executing such viewing point conversion processing is a so-called slice and dice method. This is an image processing whereby elementary parallax images in the number of m which constitute the parallax image data are shuffled to produce elementary hologram images in the number of n, thereby reconstructing a new elementary hologram image data.

Then, by exposing and recording the elementary hologram image data converted from the motion image data through the viewing point conversion processing on the hologram recording medium and printing out, it becomes possible to produce the parallax image printed matter with highly entertaining features.

Hereinabove, it has been described as for production of the parallax image printed matter that the parallax image data is produced by executing the motion compensation processing for the normal motion image data, then the elementary hologram image data which is to be exposed and recorded on the hologram recording medium is produced by executing the viewing point conversion processing for this parallax image data, however, the present invention is not limited thereto. It may also be arranged such that the geometric and/or spatial conversion processing to be executed in the motion compensation processing for the normal motion image data is executed jointly with the viewing point conversion processing which is executed at the time of producing the parallax image printed matter. In such a method described above, by geometrically or spatially adding a motion compensation amount calculated on the basis of the amount of movement of the point-of-regard to a geometric or spatial parameters to be used in the viewing point conversion processing for ensuring consistency to be maintained with a reproduced image, a viewing point conversion processing parameter containing a motion compensation amount for each frame of the ordinary motion image data can be produced. Then, using such parameters if the viewing point conversion processing is executed throughout the ordinary motion image data, the motion compensation processing described above can be executed as a part of the viewing point conversion processing.

Now, a specific arrangement for producing a hologram image data from the normal motion image data by applying the motion compensation processing and the viewing point conversion processing to be able to produce a holographic stereogram as a parallax image printed matter will be described in the following.

Figure 12:
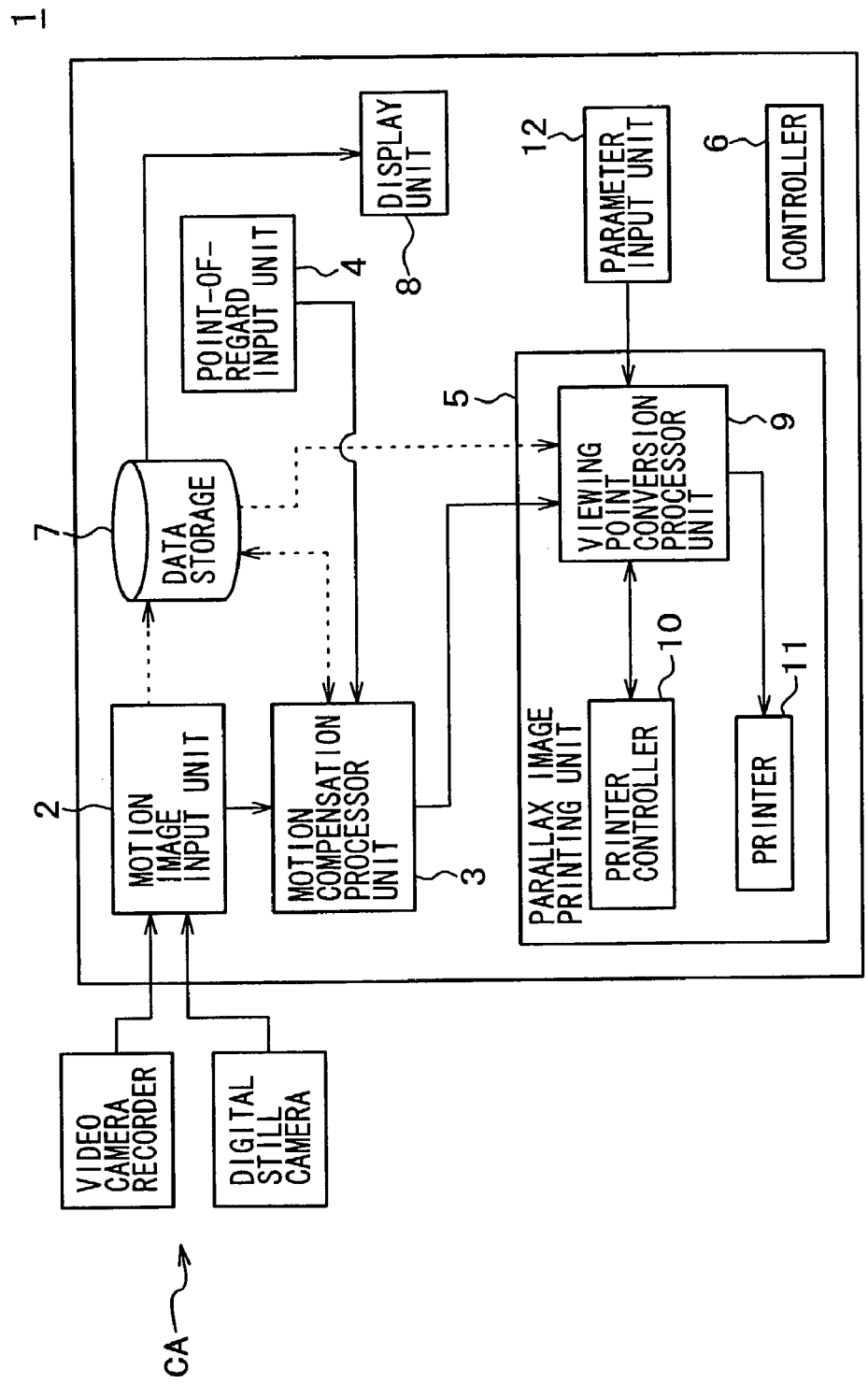
FIG. 12 is a block diagram indicating a schematic configuration of a printing device of the present invention.
Figure 13:
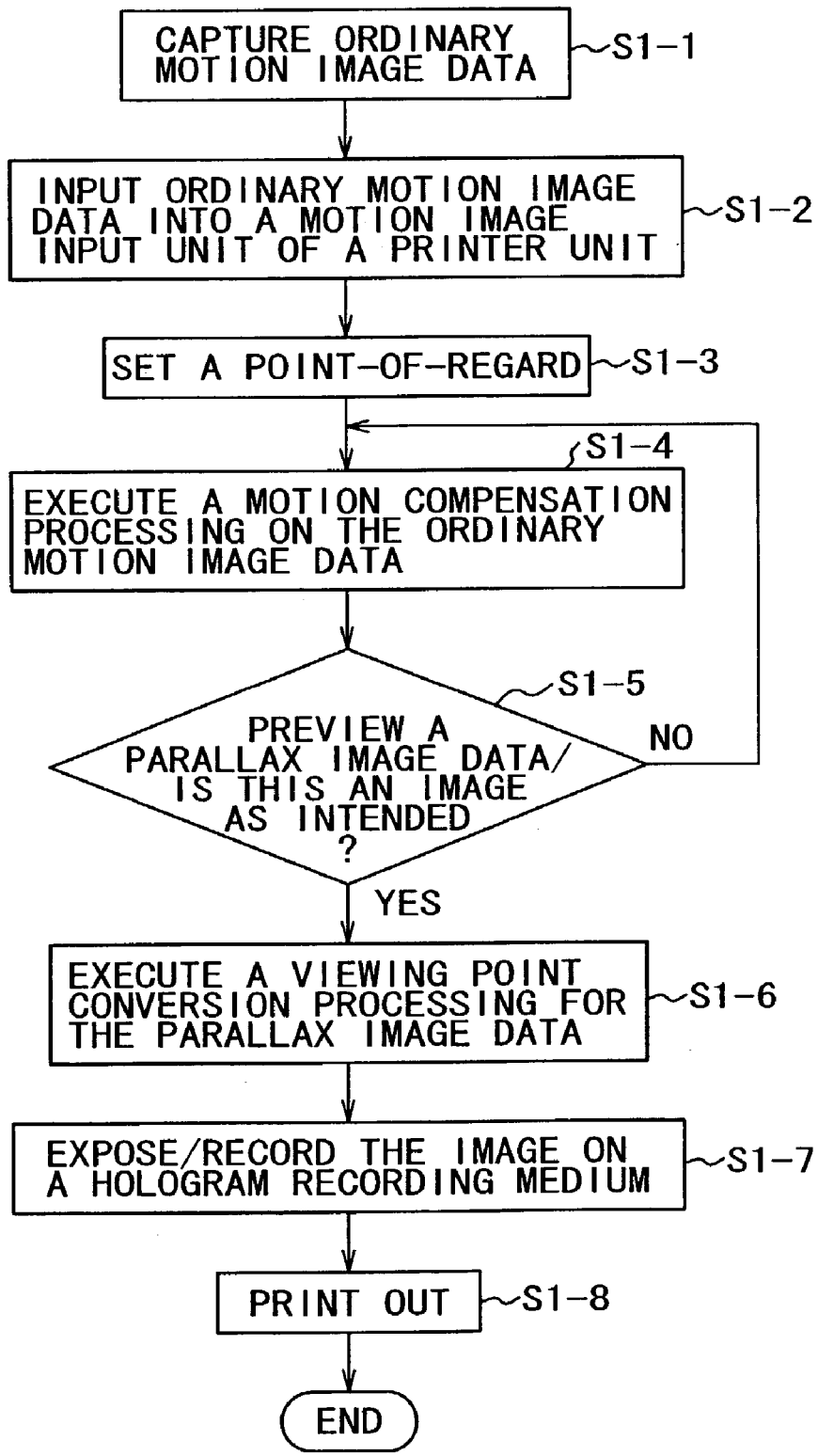
FIG. 13 is a flowchart indicating steps of producing a parallax image printed matter by the same printing device of FIG. 12.

With reference to FIGS. 12 and 13, a printing device according to a first exemplary embodiment for producing a holographic stereogram as a parallax image printed matter will be described.

As shown in FIG. 12, the printer apparatus 1 includes: a motion image input unit 2 to which an ordinary motion image data is input; a motion compensation processing unit 3 for executing a motion compensation processing to convert the normal motion image data to parallax image data; a point-of-regard input unit 4 for specifying a reference frame and a point-of-regard to be used in the motion compensation processing; a parallax image printing unit 5 for printing out a holographic stereogram; a host controller 6 for controlling respective units; a data storage 7 for storing various data such as the normal image data inputted via the motion image input unit 2, the parallax image data generated by the motion compensation processing unit 3 or the like; and a display unit 8 for displaying various image data read from the data storage 7.

To the motion image input unit 2, various normal motion image data taken with an imaging device CA such as a video camera recorder, digital still camera or the like is input. The motion image input unit 2 supplies the inputted normal motion image data to the motion compensation processing unit 3 and to the data storage 7 if required.

The motion compensation processing unit 3 executes a motion compensation processing for the normal motion image data supplied from the motion image input unit 2 or the normal motion image data read from the data storage 7 on the basis of information relating to a reference frame and a point-of-regard supplied from the point-of-regard input unit 4 as a reference for the motion compensation processing. By way of example, when a rotation processing, expansion and/or reduction processing are executed in addition to the translation motion processing as its motion compensation processing, information relating to auxiliary points-of-regard is also supplied from the point-of-regard input unit 4 as a point-of-regard data. More specifically, by executing calculation of an amount of movement of each point-of-regard in each frame, calculation of a motion compensation amount based on the amount of movement thereof, and various processing such as translation motion processing and rotation processing for the normal motion image data, the motion compensation processing unit 3 converts the normal motion image data supplied from the motion image input unit 2 or the data storage 7 to parallax image data. Then, the motion compensation processing unit 3 supplies the parallax image data thus generated to the parallax image printing unit 5 and to the data storage 7 if required.

An point-of-regard data defined by the user is inputted to the point-of-regard input unit 4. The point-of-regard input unit 4 supplies the point-of-regard data thus defined to the motion compensation processing unit.

The parallax image printing unit 5 includes a viewing point conversion processing unit 9 for generating an elementary hologram image data by executing a viewing point conversion processing, a printer controller 10 for controlling the operation of the parallax image printing unit 5, and a printer unit 11 for producing and printing out a holographic stereogram as a parallax image printed matter.

The viewing point conversion processing unit 9 is supplied with the parallax image data from the motion compensation processing unit 3 or from the data storage 7 as described above. Further, various parameters indicative of, for example, an imaging distance and imaging direction required in the viewing point conversion processing are supplied from the parameter input unit 12 to the viewing point conversion processing unit 9. The viewing point conversion processing unit 9 under the control of printer controller 10 executes the viewing point conversion processing for the parallax image data in accordance with the various parameters supplied from the parameter input unit 12 so as to generate an elementary hologram image data. Further, the viewing point conversion processing unit 9 supplies the elementary hologram image data generated to the printer unit 11.

The printer controller 10 controls the viewing point conversion processing unit 9 to execute an appropriate viewing point conversion processing for conversion from the parallax image data to the elementary hologram image data, and also controls operation for supplying the elementary hologram image data to the printer unit 11.

The printer unit 11 executes exposure and recording of the elementary hologram image data supplied from the viewing point conversion processing unit 9 on a hologram recording medium (not shown), cuts out a portion thereof on which a holographic stereogram image is recorded, and discharges the same to outside thereby completing the production of a sheet of a holographic stereogram.

As described hereinabove, the parallax image printing unit 5, by executing the viewing point conversion processing for the parallax image data, and by exposing and recording the elementary hologram image data on the hologram recording medium, produces the holographic stereogram as the parallax image printed matter.

The data storage 7 stores the normal motion image data supplied from the motion image input unit 2, and also the parallax image data supplied from the motion compensation processing unit 3. Various motion image data stored in the data storage 7 is read out and supplied to the display unit 8 under the control of the controller 6.

The display unit 8 under the control of the controller 6 displays a normal motion image data or parallax image data stored in the data storage 7. In particular, in the printer apparatus 1, by displaying the parallax image data on the display unit 8, a preview processing is enabled for the user to make a final judgment prior to printing in the parallax image printing unit 5. In the printer apparatus 1, by execution of this preview processing, the parallax image data is confirmed by the user if it is as intended and to be produced.

Through a series of steps shown in FIG. 13, the printer apparatus 1 comprised of these units described above produces the holographic stereogram as the parallax image printed matter based on the ordinary or normal motion image data.

In the printer apparatus 1, a normal motion image data is obtained by the user with an imaging device CA (step S1-1). The normal motion image data pictured in step S1-1 is inputted to the motion image input unit 2 (step S1-2). Then, a point-of-regard is set on an object in the normal motion image data inputted to the motion image input unit 2 via the point-of-regard input unit 4 by the user (step S1-3). By way of example, this point-of-regard is set, for example, by displaying the normal motion image data on the display unit 8, specifying a point arbitrarily on the displayed image with a pointing device such as a mouse, and supplying this specified point as a point-of-regard to the point-of-regard input unit 4.

Then, in the printer apparatus 1, the normal motion image data is supplied directly from the motion image input unit 2 or via the data storage 7 to the motion compensation processing unit 3, and also the point-of-regard data is supplied from the point-of-regard input unit 12 to the motion compensation processing unit 3 so as to execute the motion compensation processing (step S1-4).

Subsequently, in the printer apparatus 1, a preview processing is executed by displaying on the display unit 8 the parallax image data converted by the motion compensation processing in step S1-4 from the normal motion image data (step S1-5). Here, in the printer apparatus 1, the user confirms an image displayed on the display unit 8, and if the image is as intended, the step advances to the next step S1-6, and if it is not as intended, the step returns to step S1-4 to retry the motion compensation processing.

Then, in the printer apparatus 1, after the preview processing, the parallax image data is supplied from the motion compensation processing unit 3 or from the data storage 7 to the viewing point conversion processing unit 9 in the parallax image printing unit 5 so as to execute a viewing point conversion processing for the parallax image data (step S1-6). Thereby, the parallax image data is converted to an elementary hologram image data to be exposed and recorded on a hologram recording medium.

Further, in the printer apparatus 1, the elementary hologram image data is supplied from the viewing point conversion processing unit 9 to the printer unit 11, whereby the elementary hologram image data is exposed and recorded on a hologram recording medium (step S1-7). By way of example, this exposure and printing operation in the printer unit 11 is executed in a manner as will be described below. Firstly, in the printer unit 11, one frame image of the elementary hologram image data is displayed on a display device (not shown), then a laser beam which has transmitted through an object light optical system including this display device, i.e., an object light and a laser beam which has transmitted through a reference light optical system, i.e., a reference light are caused to fall on a hologram recording medium. Thereby, in the printer unit 11, the one frame image displayed on the display device is recorded as an elementary hologram in the form of stripes on the hologram recording medium. Then, in the printer unit 11, as the hologram recording medium is fed out by a length of one element hologram, a next image is recorded. As described above, in the printer unit 11, by recording image by image in the form of stripes on the hologram recording medium, the image is recorded thereon as a plurality of continuous elementary holograms having horizontal parallax information. Then, in the printer unit 11, ultraviolet ray irradiation and heating by a heat roller are executed followed by slicing with a cutter of a portion on which a holographic stereogram image is recorded thereby producing one sheet of a holographic stereogram. By way of example, operation of the printer unit 11 during this exposure and recording, more specifically, the operation of the display device, feeding operation of the recording medium feeder or slicing operation of the cutter provided in the printer unit 11 are controlled by the printer controller 10.

Finally, in the printer apparatus 1, a holographic stereogram is printed out as cut out per sheet (step S1-8) thereby completing a series of sequential processing.

As described heretofore, according to the printer apparatus 1 of the first exemplary embodiment of the present invention, it becomes possible even for the normal motion image data that has been obtained by the user without intending to produce a parallax image printed matter to easily be converted to parallax image data suitable for a parallax image printed matter, thereby enabling readily to obtain a parallax image printed matter such as a holographic stereogram or the like having a high entertainment feature.

In the next, a printing device for producing a holographic stereogram as a parallax image printed matter according to a second exemplary embodiment of the present invention will be described by referring to FIGS. 14 and 15.

Figure 14:
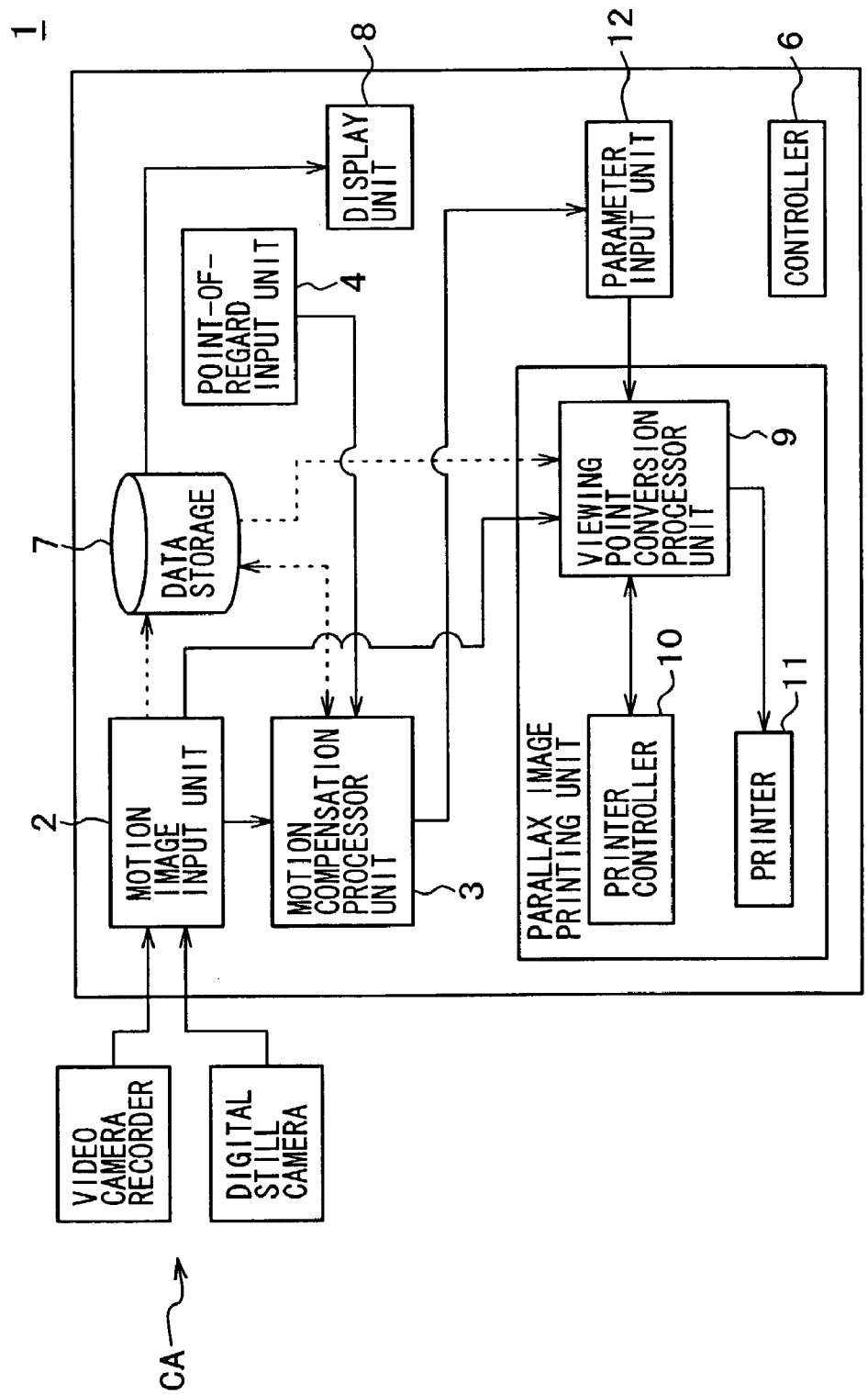
FIG. 14 is a block diagram indicating a schematic configuration of the printing device for executing a different image processing.

In contrast to the printer apparatus 1 shown in FIG. 12 in which by executing the motion compensation processing in the motion compensation processing unit 3, and after converting the normal motion image data to the parallax image data, this parallax image data is supplied to the parallax image printing unit 5, a printer apparatus 1 according to the second embodiment of the present invention shown in FIG. 14 supplies the normal motion image data to a parallax image printing unit 5, and executes a motion compensation processing for the normal motion image data as a part of its viewing point conversion processing in a parallax image printing unit 5.

That is, in the printer apparatus 1 shown in FIG. 14, the normal motion image data inputted to the motion image input unit 2 is supplied directly from the motion image input unit 2 or via the data storage 7 to the motion compensation processing unit 3 and the viewing point conversion processing unit 9. In the motion compensation processing unit 3 which is supplied with the normal motion image data, an amount of movement of a point-of-regard is measured on the basis of a point-of-regard data supplied from the point-of-regard input unit 4, and a calculation of a motion compensation amount is executed. Then, the motion compensation processing unit 3 supplies data relating to the motion compensation amount to a parameter input unit 12. The parameter input unit 12 adds geometrically or spatially the data relating to a motion compensation amount supplied from the motion compensation processing unit 3 to a parameter to be used in the viewing point conversion processing so as to generate a parameter which can be used when executing the viewing point conversion processing including the motion compensation processing for the normal motion image data, and supplies this parameter to the viewing point conversion processing unit 9. When supplied with the normal motion image data from the motion image input unit 2, the viewing point conversion processing unit 9 executes the viewing point conversion processing including the motion compensation processing for the normal motion image data on the basis of the parameter supplied from the parameter input unit 12, thereby converting the normal motion image data to an elementary hologram image data.

Figure 15:
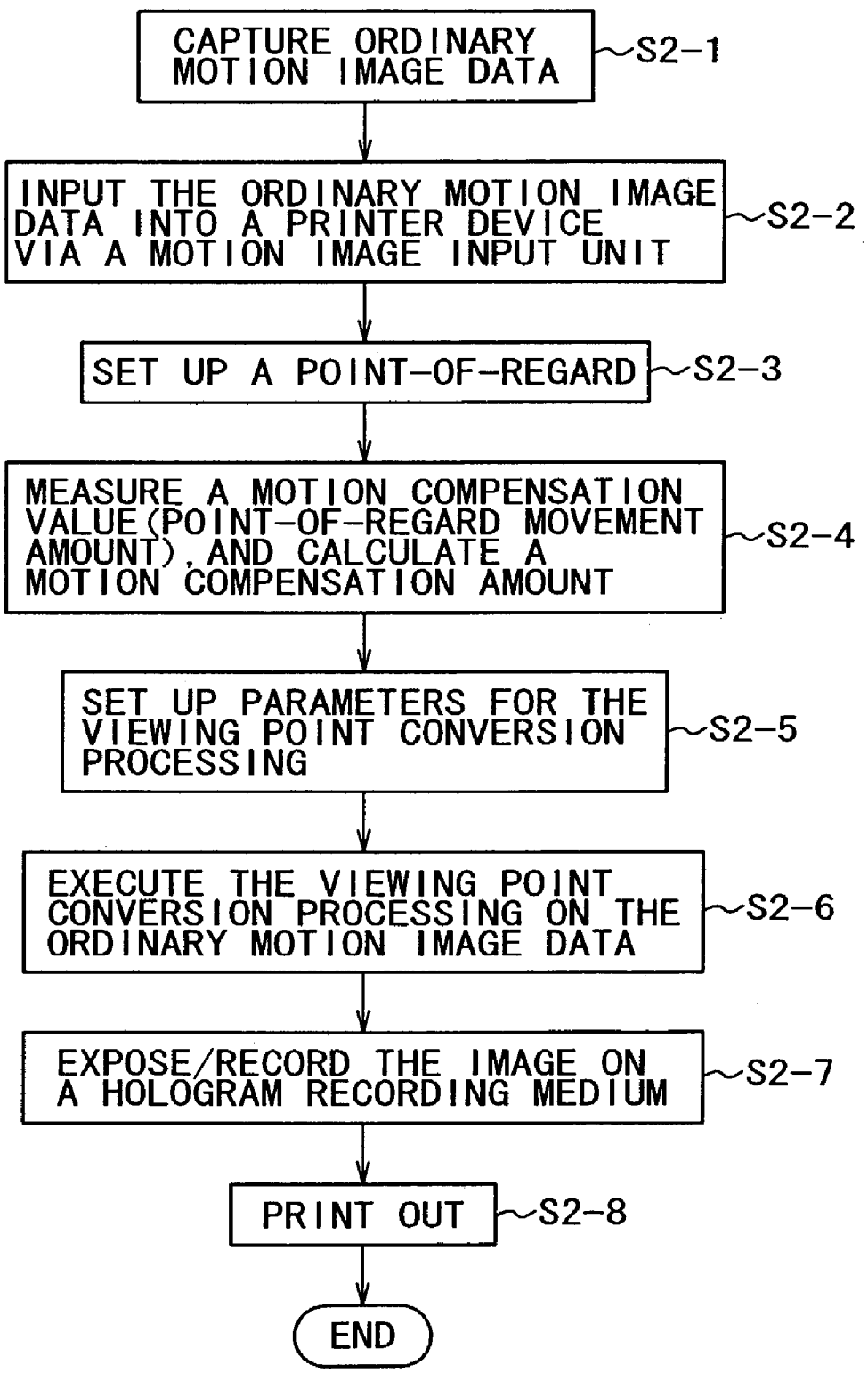
FIG. 15 is a flowchart indicating steps of producing a parallax image printed matter by the same printing device.

The printer apparatus 1 described above produces a holographic stereogram as a parallax image printed matter from the normal motion image data by executing a series of steps shown in FIG. 15.

With reference to FIGS. 14 and 15, at first, in the printer apparatus 1, the user obtains a normal motion image data with an imaging device CA (step S2-1), and this normal motion image data is inputted to the motion image input unit 2 in the printer apparatus 1 (step S2-1). Then, in the printer apparatus 1, a point-of-regard is set on an object in the normal motion image data via the point-of-regard input unit 4 by the user (step S2-3).

Then, in the printer apparatus 1, the normal motion image data is supplied directly from the motion image input unit 2 or via the data storage 7 to the motion compensation processing unit 3, and also a point-of-regard data is supplied from the point-of-regard input unit 12 to the motion compensation processing unit 3, in which an amount of movement of the point-of-regard in the normal motion image data is measured on the basis of the point-of-regard data, and a motion compensation amount is calculated on the basis of this amount of movement of the point-of-regard (step S2-4). The data relating to the motion compensation amount is supplied from the motion compensation processing unit 3 to the parameter input unit 12. In the printer apparatus 1, in order to allow for the motion compensation processing to be executed jointly as a part of the viewing point conversion processing, a parameter that can be used in the viewing point conversion processing including the motion compensation processing is generated in the parameter input unit 12 by geometrically or spatially adding the data relating to the motion compensation amount to the parameter of the viewing point conversion processing (step S2-5).

In the printer apparatus 1, when this parameter is supplied from the parameter input unit 12 to the viewing point conversion processing unit 9, in which a viewing point conversion processing is executed for the normal motion image data supplied from the motion image input unit 2 (step S2-6) thereby converting the normal motion image data to an elementary hologram image data. The motion compensation processing is executed as a part of this viewing point conversion processing.

Subsequently, in the printer apparatus 1, the elementary hologram image data is supplied from the viewing point conversion processing unit 9 to a printer unit 11, and this printer unit 11 executes exposure and recording of the elementary hologram image data on a hologram recording medium (step S2-7).

Finally, in the printer apparatus 1, as each holographic stereogram is printed out on a cut sheet (step S2-8), the series of sequential steps is completed.

As described hereinabove, according to the printer apparatus 1 of the second exemplary embodiment of the present invention, the motion compensation processing can be executed jointly with the viewing point conversion processing. Therefore, even if it is an ordinary motion image data pictured by the user without intention to produce a parallax image printed matter, it can be easily converted to an elementary hologram image data suitable for the parallax image printed matter.

Heretofore, the present invention has been described by way of example of the printer apparatus 1 in which the steps of image processing and the production of the parallax image printed matter are executed in the same unit. However, in the following, a printed matter production system using this printing apparatus 1 of the present invention will be described. This printed matter production system includes a plurality of devices such as a communication terminal device and the printing device.

A printed matter production system which utilizes the printing apparatus 1 shown in FIG. 12 according to the first exemplary embodiment of the present invention will be described by referring to FIGS. 16 and 17.

Figure 16:
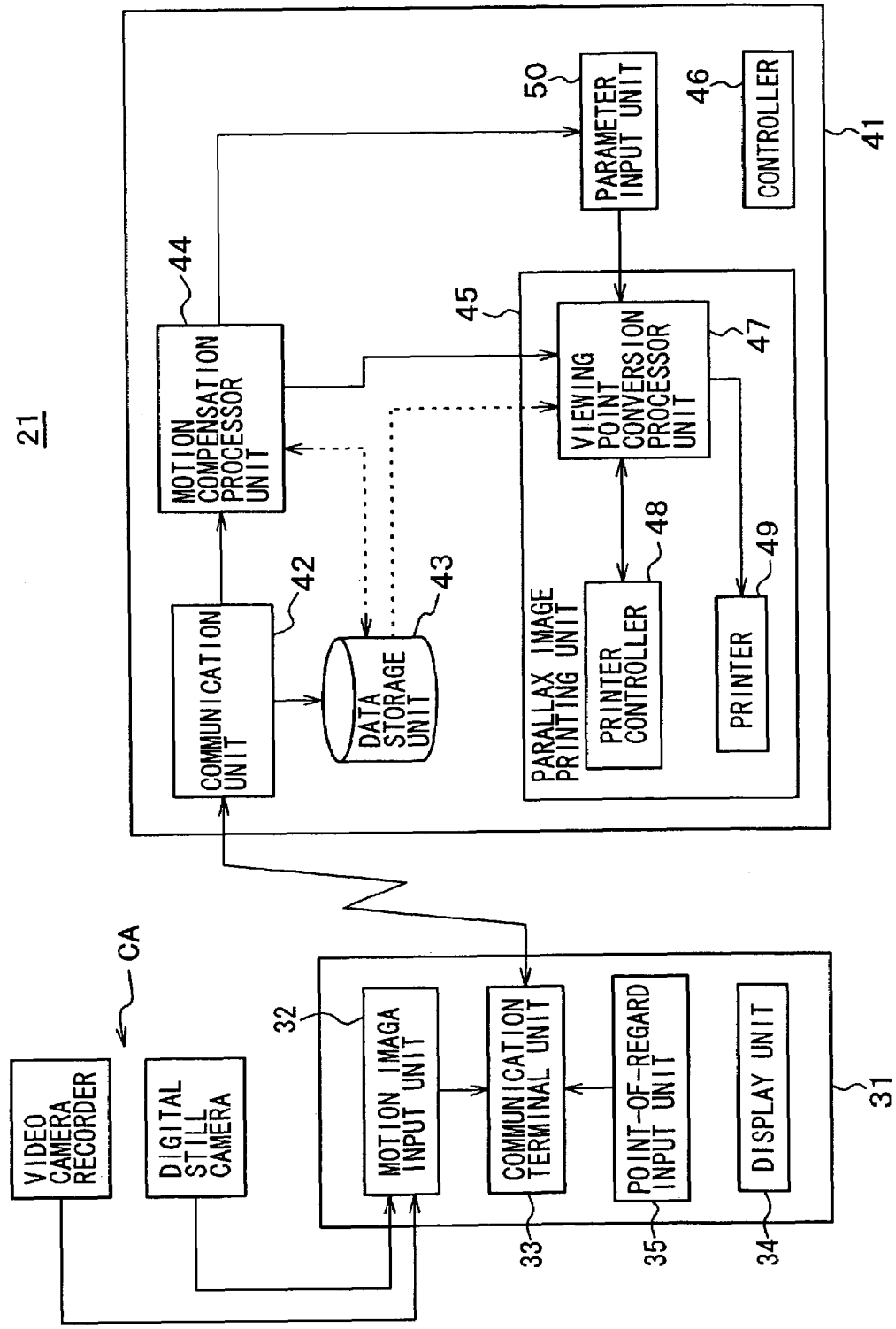
FIG. 16 is a block diagram indicating a schematic configuration of a printed matter production system of the present invention.

With reference to FIG. 16, a printed matter production system 21 includes a communication terminal apparatus 31 to which an ordinary motion image data obtained with an imaging device CA is inputted, and a printer apparatus 41 which can exchange the motion image data with this communication terminal apparatus 31.

The communication terminal apparatus 31, which is an electronic device such as a personal computer, mobile phone or the like which can exchange data with other electronic devices regardless wired or wireless, includes: a motion image input unit 32; a communication terminal unit 33 which serves as an interface with external electronics devices; a display unit 34; and a point-of-regard input unit 35. In this communication terminal apparatus 31, an ordinary motion image data pictured with imaging device CA is inputted to the motion image input unit 32. Further, the communication terminal unit 33 is supplied with a normal motion image data from the motion image input unit 32, and with a point-of-regard data specified by the user from the point-of-regard input unit 32. The communication terminal apparatus 31 transmits the ordinary motion image data and the point-of-regard data via the communication terminal unit 33 to an external electronics device, in this instance, to the printer apparatus 41.

The printer apparatus 41 includes: a communication unit 42 for receiving data; a data storage 43; a motion compensation processing unit 44; a parallax image printer unit 45; and a controller 46 for controlling the processing in the motion compensation processing 44 and overall operation of the system. The communication unit 42 which serves as an interface with external electronics devices receives, in this instance, the ordinary motion image data and the point-of-regard data sent from the communication terminal apparatus 31. The motion compensation processing unit 44 executes a motion compensation processing on the basis of the ordinary motion image data and the point-of-regard data sent from the communication terminal apparatus 31, more specifically, it executes calculation of a motion compensation amount, and a translation motion processing, rotation processing and the like for the normal motion image data. The parallax image printing unit 45, which includes a viewing point conversion processing unit 47, a printer controller 48 and a printer 49, executes a viewing point conversion processing in the viewing point conversion processing unit 47 for the parallax image data which was converted from the normal motion image data by the motion compensation processing in the motion compensation processing unit 44, and production of a holographic stereogram in the printer 49. By way of example, a parameter required in the viewing point conversion processing in the viewing point conversion processing unit 47 is supplied from the parameter input unit 50.

Figure 17:
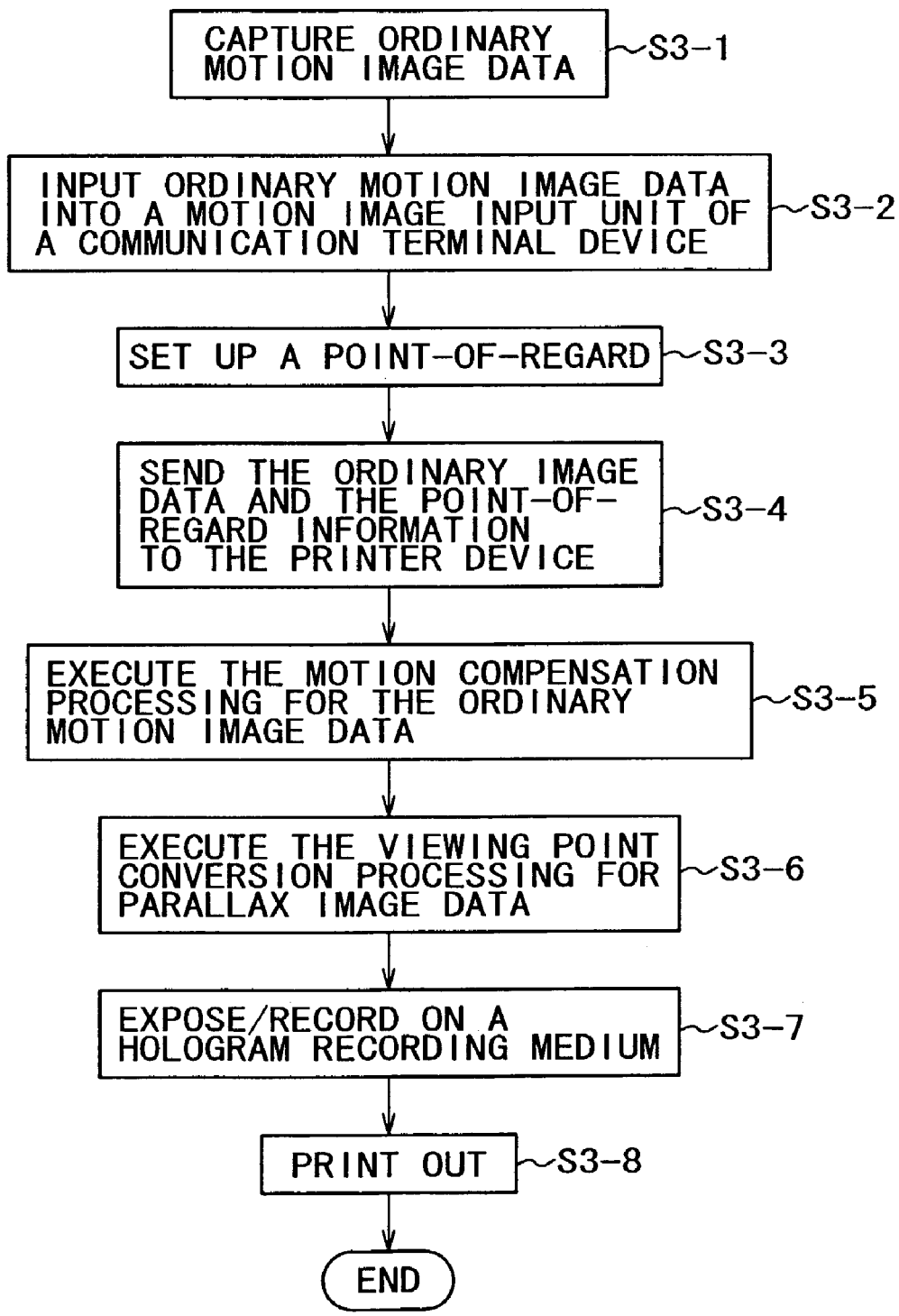
FIG. 17 is a flowchart indicating steps of producing a parallax image printed matter in the printed matter production system of FIG. 16.

In this printed matter production system 21 described above, through a series of sequential steps as indicated in FIG. 17, a holographic stereogram is produced as a parallax image printed matter based on the ordinary motion image data.

Firstly, in the printed matter production system 21, a normal motion image data is pictured by the user with an imaging device CA or the like (step S3-1), and this normal motion image data is inputted to the motion image input unit 32 in the communication terminal apparatus 31 (step S3-2). Then, in the printed matter production system 21, a point-of-regard is set on an object in the normally pictured motion image data inputted to the motion image input unit 32 by the user via the point-of-regard input unit 35 (step S3-3) Then, in the printed matter production system 21, the normally pictured motion image data which was inputted to the motion image input unit 32 and the point-of-regard which was set via the point-of-regard input unit 35 are supplied to the communication terminal unit 33 so as to transmit these normally pictured motion image data and the point-of-regard data from the communication terminal unit 33 to the communication unit 42 in the printer apparatus 41 (step S3-4).

In the printed matter production system 21, the normally pictured motion image data and the point-of-regard received by the communication unit 42 in the printer apparatus 41 are supplied directly or via the data storage 43 to the motion compensation processing unit 44 whereby a motion compensation processing is executed to convert the normally pictured motion image data to parallax image data (step S3-5). Subsequently, in the printed matter production system 21, the parallax image data after conversion is supplied to the viewing point conversion processing unit 47 in the parallax image printing unit 45, in which a viewing point conversion processing therefor is executed on the basis of a parameter supplied from the parameter input unit 50 (step S3-6). In the printed matter production system 21, an elementary hologram image data obtained by this viewing point conversion processing is supplied to the printer unit 49 whereby the elementary hologram image data is exposed and recorded on a hologram recording medium (step S3-7). Then, in the printed matter production system 21, each holographic stereogram is printed out on a cut sheet (step S3-8), and a series of steps of processing is completed.

As described hereinabove, according to the printed matter production system 21 using the printing unit 1 according to the first embodiment of the present invention, it becomes possible even for the normally pictured motion image data pictured by the user without intention to produce a parallax image printed matter, if the user has a communication terminal apparatus 31, easily to be converted to an elementary hologram image data suitable for a parallax image printed matter by the printer apparatus 41, thereby enabling to readily obtain a parallax image printed matter such as a holographic stereogram or the like with highly entertaining features.

By way of example, in the printed matter production system 21 described above, it is set forth that the normally pictured motion image data is converted to the parallax image data by executing the motion compensation processing in the motion compensation processing unit 44, and that this parallax image data is supplied to the viewing point conversion processing unit 47 for executing the viewing point conversion, however, the arrangement for executing these processing described above is not limited thereto. For example, in the printed matter production system 21, it may also be arranged such that the motion compensation processing unit 44 executes only up to a calculation of a motion compensation amount, then supplies this data relating to the motion compensation amount to the parameter input unit 50, and that the viewing point conversion processing unit 47 when supplied with the normally pictured motion image data executes the viewing point conversion processing for the normally pictured motion image data on the basis of a parameter which is generated in the parameter supply unit 50 by adding the motion compensation amount. In this instance, the motion compensation processing is executed as a part of the viewing point conversion processing.

Figure 18:
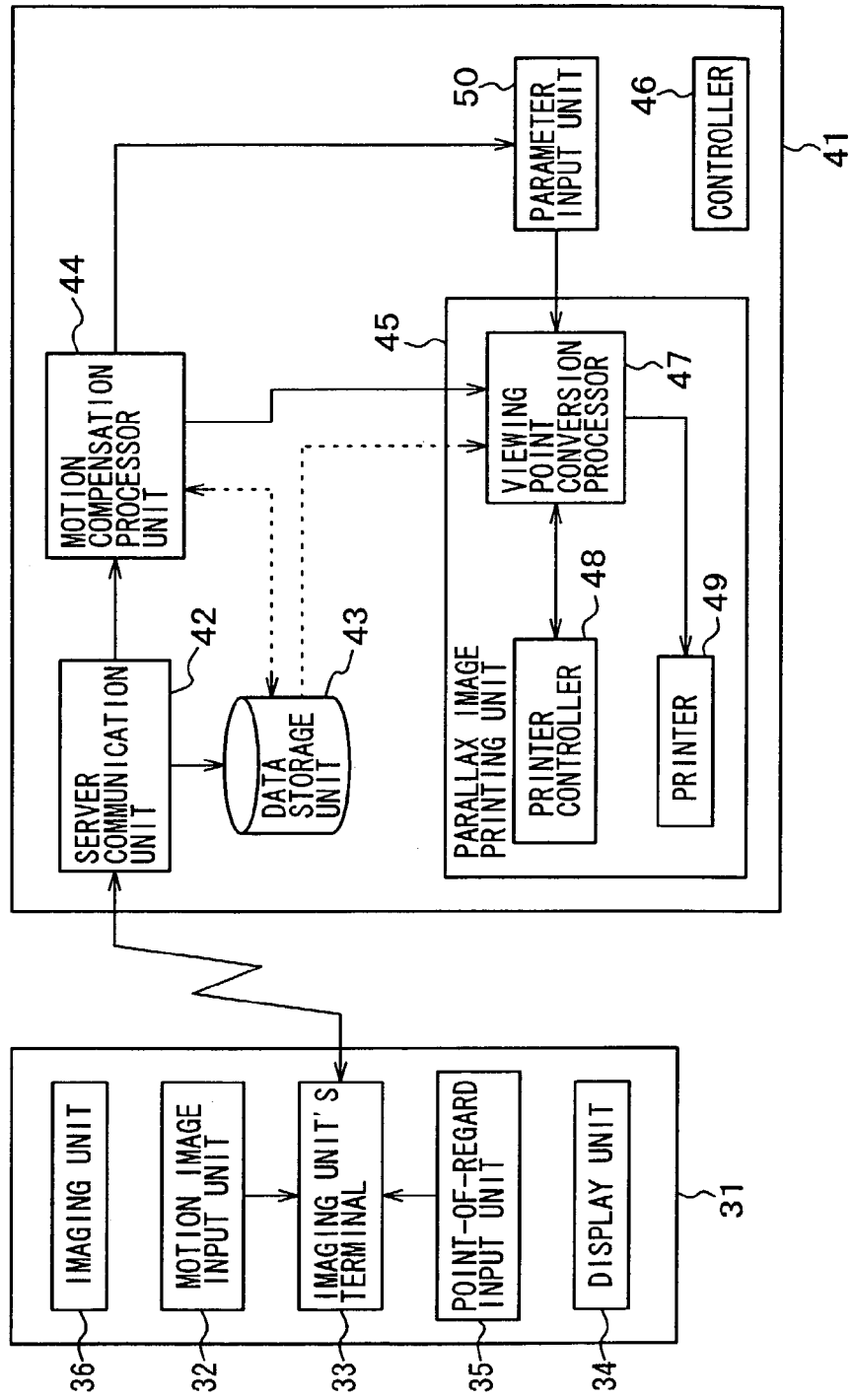
FIG. 18 is a block diagram indicating a schematic configuration of a printed matter production system having another arrangement.

Further, in the printed matter production system 21 described above, as indicated in FIG. 18, its communication terminal apparatus 31 may also include an imaging unit 36 capable of picturing a normal motion image data.

Still further, in the printed matter production system 21 described above, it may also be arranged such that the image processing or the like of the normally pictured motion image data can be executed on the side of the communication terminal apparatus 31. A printed matter production system 51 according to the present invention in which the conversion from a normally pictured motion image data to parallax image data is executed on the side of its communication terminal apparatus 31 will be described in the following. By way of example, components and parts in this embodiment having the same constitutions as in the printed matter production system 21 are attached with the same symbols and numerals, and detailed description thereof omitted.

Figure 19:
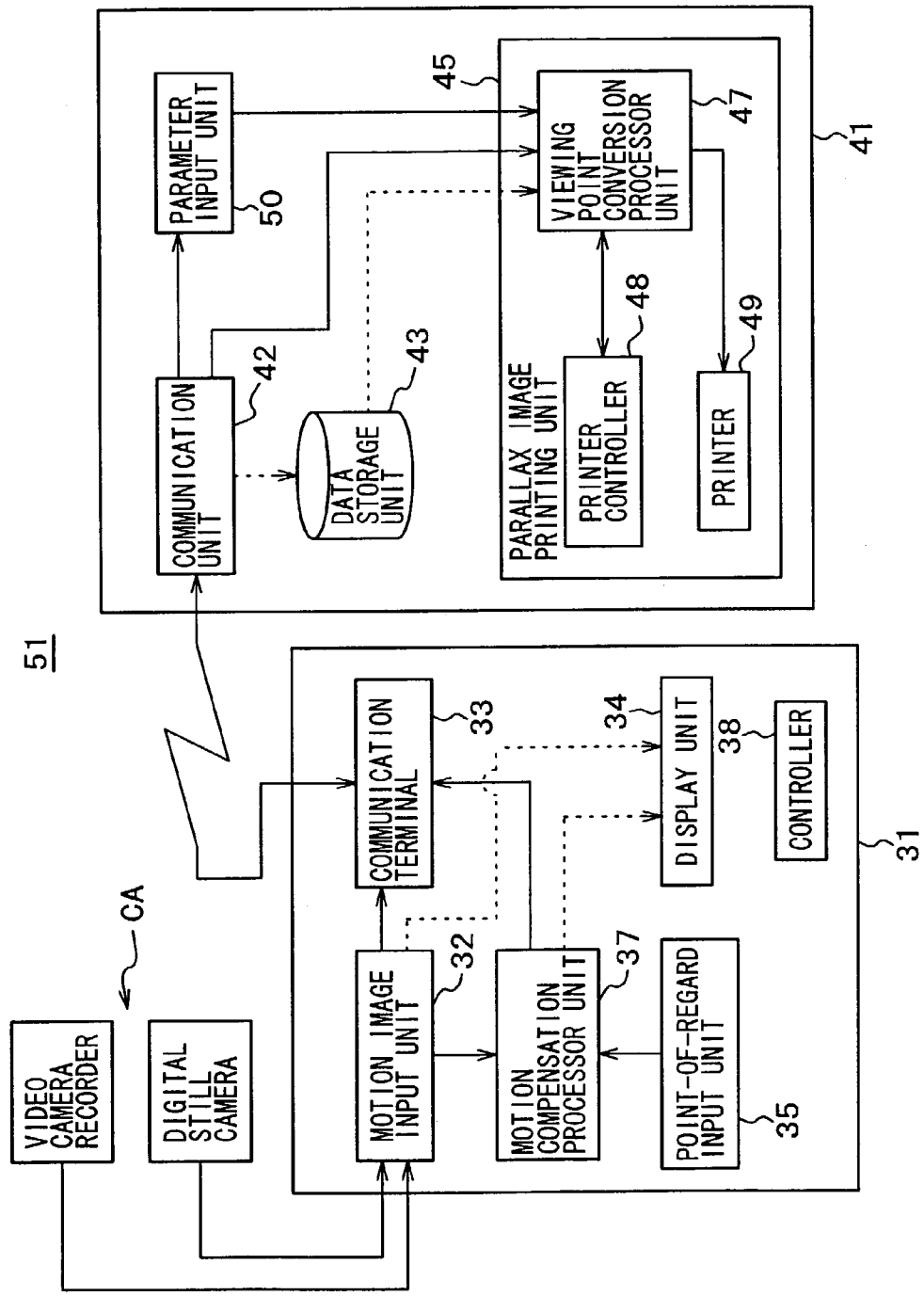
FIG. 19 is a block diagram indicating a schematic configuration of a printed matter production system having still another arrangement.

With reference to FIG. 19, the printed matter production system 51 includes: a communication terminal apparatus 31 to which motion image data normally pictured by the user with an imaging device CA is input; and a printer apparatus 41 which is capable of exchanging the motion image data with the communication terminal apparatus 31, wherein a motion compensation processing unit 37 provided in the communication terminal apparatus 31 executes a conversion from the normally pictured motion image data to parallax image data. By way of example, in the communication terminal apparatus 31, a controller 38 is provided for controlling the processing in the motion compensation processing unit 37 and for executing an overall control of the system.

Figure 20:
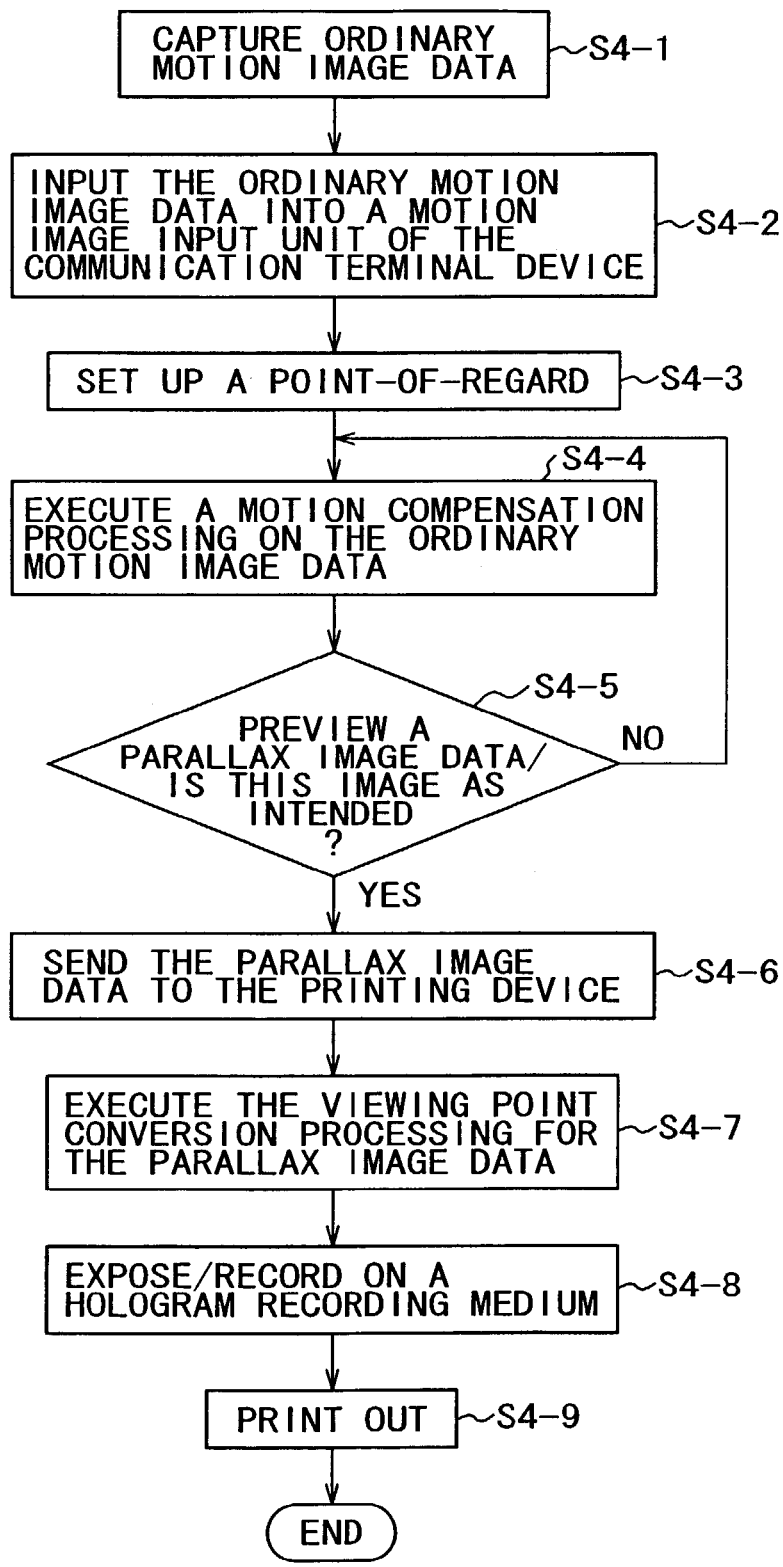
FIG. 20 is a flowchart indicating steps of producing a parallax image printed matter in the printed matter production system of FIG. 19.
Figure 22A:
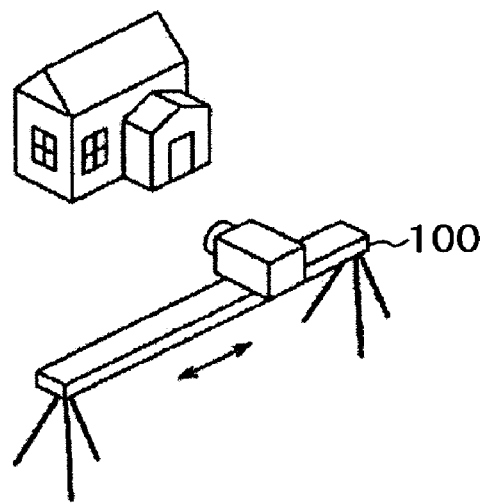
FIGS. 22(a)-22(b) are drawings indicating conventional methods for taking motion image data for use in producing the parallax image printed matter.
Figure 22B:
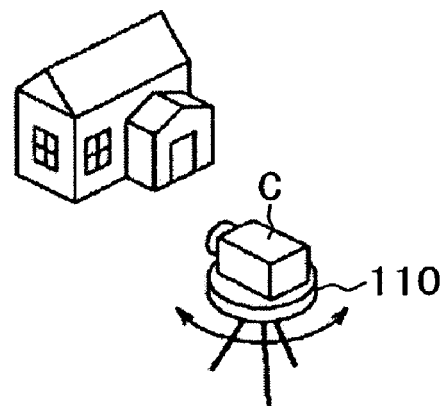

The printed matter production system 51 of the present invention described above, through a series of steps of processing as indicated in FIG. 20, produces a holographic stereogram as a parallax image printed matter on the basis of the normally pictured motion image data.

Firstly, in the printed matter production system 51, motion image data is pictured ordinarily with an imaging device CA or the like (step S4-1), and this normal motion image data is inputted to a motion image input unit 32 in the communication terminal apparatus 31 (step S4-2). Then, in the printed matter production system 51, the user sets a point-of-regard on an object in the normally pictured motion image data inputted to the motion image input unit 32 via a point-of-regard input unit 35 (step S4-3). Then, in the printed matter production system 51, the normally pictured motion image data inputted via the motion image input unit 32 and the point-of-regard set on the object via the point-of-regard input unit 35 are supplied to a motion compensation processing unit 37 whereby to execute a motion compensation processing (step S4-4). Subsequently, in the printed matter production system 51, a preview processing is executed by displaying parallax image data, which was converted from the normally pictured motion image data by subjecting to the motion compensation processing in step S4-4, on a display unit 34 (step S4-5). Here, in the printed matter production system 51, if the user confirms an image displayed on the display unit 34 to be an image as intended, the process flow advances to the next step of S4-6, and if it is not as intended, the process returns to the step S4-4 again to execute the motion compensation processing.

In the printed matter production system 51, after the preview processing, the parallax image data is transmitted via the communication terminal unit 33 to a communication unit 42 in the printer apparatus 41 (step S4-6). In the printed matter production system 51, the parallax image data received via the communication unit 42 is supplied directly or via data storage 43 to a viewing point conversion processing unit 47 in which a viewing point conversion processing is executed in accordance with a parameter supplied from a parameter input unit 50 (step S4-7). In the printed matter production system 51, the parallax image data is converted to an elementary hologram image data that can be exposed and recorded on a hologram recording medium, and is supplied to a printer unit 49, thereby executing the exposure and recording thereof on the hologram recording medium (step S4-8). Subsequently, in the printed matter production system 51, each holographic stereogram is printed out on a cut sheet (step S4-9), thereby completing a series of steps of processing.

As described hereinabove, according to the printed matter production system 51, it becomes possible even for motion image data normally pictured by the user without intending to produce a parallax image printed matter, if the user has the communication terminal apparatus 31 of the present invention, easily to be converted by execution of the motion compensation processing to parallax image data suitable for a parallax image printed matter, then by transmitting the parallax image data to the printer apparatus 41, it becomes possible readily to obtain a parallax image printed matter such as a holographic stereogram with highly entertaining features.

It is set forth in the printed matter production system 51 described above that the parallax image data converted in the motion compensation processing unit 37 is transmitted to the printer apparatus 41, however, it is not limited thereto. For example, it may also be arranged such that the motion compensation processing unit 37 executes steps only up to the calculation of a motion compensation amount, and the data relating to this motion compensation and the normally pictured motion image data are transmitted to the printer apparatus 41. In this instance, in the printer unit 41, a viewing point conversion processing which includes the motion compensation processing as its part is executed.

Further, in the printed matter production system 51 described above, it may also be arranged such that together with the parallax image data after subjected to the motion compensation processing, the data relating to the motion compensation amount computed in the motion compensation processing unit 37 is transmitted to printer apparatus 41. Still further, it may also be arranged such that all of the normally pictured image data, the data of the motion compensation amount and the parallax image data are transmitted to the printer apparatus 41. In such instances, in the printer apparatus 41, the normally pictured motion image data prior to the conversion and the data relating to the motion compensation amount are stored in the data storage 43 together with the parallax image data or the like as customer information belonging to the user.

Furthermore, in the printed matter production system described above, it may also be arranged such that the communication terminal apparatus 31 includes an imaging unit 36 capable of picturing a normal motion image data.

In the description of the preferred embodiment of the present invention set forth hereinabove, it has been described by way of example of the holographic stereogram as the parallax image printed matter, however, it is not limited thereto, and the present invention can be applied to any parallax image printed matter other than the holographic stereogram, for example, such as a printed matter of a so-called lenticular photograph which uses a lenticular lens.

Still more, in the description of the preferred embodiment of the present invention set forth hereinabove, the normal or ordinary motion image data has been described as one that has pictured an actual object with the imaging device, however, it is not limited thereto, and it may be any motion image data generated by various CG techniques, for example, such as the so-called Z buffer method, rate racing method, or radio intensity method, generated by virtually imaging as if translating the camera relatively to the object.

Furthermore, although the present invention has been described in its preferred form with a certain degree of particularity, obviously many changes, variations and combinations are possible herein. It is therefore to be understood that any modifications will be practiced otherwise than as specifically described herein without departing from the scope of the present invention.

What is claimed is:

1. An image processing apparatus comprising:
   point-of-regard setting means for selecting at least one frame as a reference frame from a plurality of frames that constitute motion image data and setting a point-of-regard on an object in said reference frame;
   motion compensation processing means for calculating an amount of movement of the point-of-regard using a relation between the point-of-regard set on the object in said reference frame and a point corresponding to said point-of-regard in another frame, calculating a motion compensation amount for each frame based on said amount of movement, and executing a motion compensation processing for said motion image data based on said motion compensation amount; and
   a supplier for supplying an output of said motion compensation processing means to an image conversion processor, said image conversion processor being operable to convert said motion image data to parallax image data for printing as parallax image printed matter, in which a perceived image varies depending on a viewing angle,
   whereby frame-based motion image data is converted to parallax printing data according to frame-to-frame motion compensation data.

2. The image processing apparatus as claimed in claim 1, wherein
   said parallax image printed matter is a holographic stereogram, and
   said present image processing apparatus further comprises an image conversion processor for converting said parallax image data obtained by said motion compensation processing means to data for printing as said holographic stereogram.

3. The image processing apparatus as claimed in claim 2, wherein said image conversion processor executes a viewing point conversion processing for said parallax image data.

4. The image processing apparatus as claimed in claim 1, wherein said parallax image printed matter is printed matter produced utilizing a lenticular method.

5. The image processing apparatus as claimed in claim 1, wherein said motion compensation processing means calculates said amount of movement of the point-of-regard by a correlation processing.

6. The image processing apparatus as claimed in claim 1, wherein said motion compensation processing means executes a translation motion processing for each frame based on said motion compensation amount.

7. The image processing apparatus as claimed in claim 6, wherein said motion compensation processing means executes, in addition to said translation motion processing, at least one of a rotation processing and an expansion/reduction processing for each frame based on said motion compensation amount.

8. The image processing apparatus as claimed in claim 1, wherein said motion compensation processing means executes a motion compensation processing using said amount of movement of the point-of-regard in each frame as said motion compensation amount.

9. The image processing apparatus as claimed in claim 1, wherein said motion compensation processing means calculates said motion compensation amount by performing a functional conversion of said amount of movement of the point-of-regard in each frame.

10. The image processing apparatus as claimed in claim 6, wherein said motion compensation processing means executes, in addition to said translation motion processing, a clip processing for extracting a common region having image information for each frame.

11. The image processing apparatus as claimed in claim 10, wherein said motion compensation processing means executes, in addition to said clip processing, an expansion processing for expanding a size of the common region extracted by said clip processing to an original frame size in each frame.

12. The image processing apparatus as claimed in claim 1, wherein said motion compensation processing means calculates said motion compensation amount by executing one of a smoothing processing and an approximated curve processing for said amount of movement of the point-of-regard in each frame.

13. The image processing apparatus as claimed in claim 1, further comprising display means for displaying said parallax image data.

14. A method of image processing, comprising using a processor to perform the steps of:
   specifying at least one frame as a reference frame from a plurality of frames that constitute motion image data, and setting a point-of-regard on an object in said reference frame;
   calculating an amount of movement of the point-of-regard using a relation between said point-of-regard in said reference frame and a point corresponding thereto in another frame, calculating a motion compensation amount for each frame based on said amount of movement calculated, and executing a motion compensation processing for said motion image data based on said motion compensation amount; and
   supplying an output of said motion compensation processing for image conversion processing, said image conversion processing including converting said motion image data to parallax image data that can be printed as parallax image printed matter in which a perceived image varies depending on a viewing angle,
   whereby frame-based motion image data is converted to parallax printing data according to frame-to-frame motion compensation data.

15. An image processing apparatus comprising:
   point-of-regard setting means for specifying at least one frame as a reference frame from a plurality of frames that constitute motion image data, and setting a point-of-regard on an object in said reference frame;
   compensation amount calculation means for calculating an amount of movement of said point-of-regard using a relation between said point-of-regard in said reference frame and a point corresponding thereto in another frame, and calculating a motion compensation amount for each frame on the basis of said amount of movement calculated;
   a generator for generating a parameter for use in an image conversion to which said motion compensation amount calculated by said motion compensation amount calculation means is added; and
   a supplier for supplying an output from said generator to an image conversion processor, said image conversion processor being operable to convert said motion image data to parallax image data that can be printed as a parallax image printed matter, based on said parameter,
   whereby frame-based motion image data is converted to parallax printing data according to frame-to-frame motion compensation data.

16. A method of image processing, comprising using a processor to perform the steps of:
   specifying at least one frame as a reference frame from a plurality of frames that constitute motion image data, and setting a point-of-regard on an object in said reference frame;
   calculating an amount of movement of said point-of-regard using a relation between said point-of-regard in said reference frame and a point corresponding thereto in another frame, and calculating a motion compensation amount for each frame based on said amount of movement of said point-of-regard;
   generating a parameter for use in an image conversion, to which said motion compensation amount is added; and
   supplying an output of said generating step for use in image conversion processing, said image conversion processing including converting said motion image data to data for printing as parallax image printed matter based on said parameter,
   whereby frame-based motion image data is converted to parallax printing data according to frame-to-frame motion compensation data.

17. A printed matter production apparatus comprising:
   point-of-regard setting means for specifying at least one frame as a reference frame from a plurality of frames that constitute motion image data, and setting a point-of-regard on an object in said reference frame;
   motion compensation processing means for calculating an amount of movement of said point-of-regard using a relation between the point-of-regard set in said reference frame and a point corresponding thereto in another frame, calculating a motion compensation amount for each frame based on said amount of movement calculated, and executing a motion compensation processing for said motion image data based on said motion compensation amount;
   a supplier for supplying an output from said motion compensation processing means to an image conversion processor, said image conversion processor being operable to convert said motion image data to parallax image data for printing as parallax image printed matter, in which a perceived image varies depending on its viewing angle; and
   printing means for printing said parallax image printed matter based on said parallax image data,
   whereby frame-based motion image data is converted to parallax printing data according to frame-to-frame motion compensation data.

18. The printed matter production apparatus as claimed in claim 17, wherein
   said parallax image printed matter is a holographic stereogram, and
   said present image processing apparatus further comprises an image conversion processor for converting said parallax image data obtained by said motion compensation processing means to data that can be printed as a holographic stereogram, and wherein
   said printing means prints out said holographic stereogram as said parallax image printed matter.

19. The printed matter production apparatus as claimed in claim 18, wherein said image conversion processor executes a viewing point conversion processing for said parallax image data.

20. The printed matter production apparatus as claimed in claim 18, further comprising imaging means for capturing said motion image data.

21. The printed matter production apparatus as claimed in claim 17, further comprising display means for displaying said parallax image data.

22. A method of producing a printed matter, comprising using a processor to perform the steps of:
specifying at least one frame as a reference frame from a plurality of frames that constitute motion image data, and setting a point-of-regard on an object in said reference frame;
calculating an amount of movement of said point-of-regard using a relation between the point-of-regard in said reference frame and a point corresponding thereto in another frame, calculating a motion compensation amount for each frame based on said amount of movement, and executing a motion compensation processing for said motion image data based on said motion compensation amount;
supplying an output of said motion compensation processing for image conversion processing, said image conversion processing including, converting said motion image data to parallax image data that can be printed as parallax image printed matter in which a perceived image varies depending on its viewing angle; and
printing a parallax image printed matter based on said parallax image data,
whereby frame-based motion image data is converted to parallax printing data according to frame-to-frame motion compensation data.

23. The method of producing a printed matter as claimed in claim 22, wherein
said parallax image printed matter is a holographic stereogram,
and further comprising a step of executing a viewing point conversion processing for converting said parallax image data to data that can be printed as a holographic stereogram, and
said holographic stereogram printed as said parallax image printed matter.

24. A printed matter production apparatus comprising:
point-of-regard setting means for specifying at least one frame as a reference frame from a plurality of frames that constitute motion image data, and setting a point-of-regard on an object in said reference frame;
motion compensation amount calculation means for calculating an amount of movement of said point-of-regard using a relation between the point-of-regard set in said reference frame and a point corresponding thereto in another frame, and calculating a motion compensation amount for each frame based on said amount of movement;
a generator for generating a parameter relating to image conversion, to which said motion compensation amount calculated by said motion compensation calculation means is added;
a supplier for supplying an output from said generator into an image conversion processor, said image conversion processor being operable to convert said motion image data to data for printing as parallax image printed matter based on said parameter calculated; and
printing means for printing said parallax image printed matter based on said data converted,
whereby frame-based motion image data is converted to parallax printing data according to frame-to-frame motion compensation data.

25. A method of producing a printed matter, comprising using a processor to perform the steps of:
specifying at least one frame as a reference frame from a plurality of frames that constitute motion image data, and setting a point-of-regard on an object in said reference frame;
calculating an amount of movement of said point-of-regard using a relation between the point-of-regard in said reference frame and a point corresponding thereto in another frame, and calculating a motion compensation amount based on said amount of movement;
generating a parameter relating to image conversion, to which said motion compensation amount calculated is added;
supplying an output of said generating step for image conversion processing, said image conversion processing including converting said motion image data to data for printing as parallax image printed matter based on said parameter generated; and
printing said parallax image printed matter based on said data converted,
whereby frame-based motion image data is converted to parallax printing data according to frame-to-frame motion compensation data.

26. A printed matter production system comprising
a communication terminal device comprising: motion image input means for inputting motion image data; point-of-regard setting means for specifying at least one frame as a reference frame from a plurality of frames that constitute the motion image data, and setting a point-of-regard on an object in said reference frame; and first communication means for transmitting data relating to said motion image data and said point-of-regard, and
a printing device comprising: second communication means for receiving data from said first communication means; motion compensation processing means for calculating an amount of movement of said point-of-regard using a relation between the point-of-regard in said reference frame and a point corresponding thereto in another frame, calculating a motion compensation amount for each frame based on said amount of movement, and executing a motion compensation processing for said motion image data based on said motion compensation amount; a supplier for supplying an output from said motion compensation processing means to an image conversion processor, said image conversion processor being operable to convert said motion image data to parallax image data for printing as parallax image printed matter in which a perceived image varies depending on its viewing angle; and printing means for printing said parallax image printed matter based on said parallax image data converted,
whereby frame-based motion image data is converted to parallax printing data according to frame-to-frame motion compensation data.

27. The printed matter production system as claimed in claim 26, wherein said communication terminal device further comprises imaging means for said motion image data.

28. A printing device comprising:
communication means for receiving data relating to motion image data, a reference frame in said motion image data and a point-of-regard set on an object in said reference frame from an external device;
motion compensation processing means for calculating an amount of movement of said point-of-regard using a relation between the point-of-regard in said reference frame and a point corresponding thereto in another frame, calculating a motion compensation amount for each frame based on said amount of movement calculated, and executing a motion compensation processing for said motion image data based on said motion compensation amount;

a supplier for supplying an output from said motion compensation processing means to an image conversion processor, said image conversion processor being operable to convert said motion image data to parallax image data for printing as parallax image printed matter in which a perceived image varies depending on its viewing angle; and printing means for printing said parallax image printed matter based on said parallax image data, whereby frame-based motion image data is converted to parallax printing data according to frame-to-frame motion compensation data.

29. A printed matter production system comprising a communication terminal device comprising: motion image input means for inputting motion image data; point-of-regard setting means for specifying at least one frame as a reference frame from a plurality of frames that constitute the motion image data, and setting a point-of-regard on an object in said reference frame; motion compensation processing means for calculating an amount of movement of said point-of-regard using a relation between the point-of-regard in said reference frame and a point corresponding thereto in another frame, calculating a motion compensation amount for each frame based on said amount of movement calculated, and executing a motion compensation processing for said motion image data based on said motion compensation amount; a supplier for supplying an output of said motion compensation processing means to an image processing means, said image processing means being operable to convert said motion image data to parallax image data for printing as parallax image printed matter in which a perceived image varies depending on a viewing angle; and first communication means for transmitting data relating to said motion image data, and a printing device comprising: second communication means for receiving said data from said first communication means; and printing means for printing said parallax image printed matter based on said data relating to said motion image data, whereby frame-based motion image data is converted to parallax printing data according to frame-to-frame motion compensation data.

30. The printed matter production system as claimed in claim 29, wherein said communication terminal device further comprises an imaging device for capturing said motion image data.

31. The printed matter production system as claimed in claim 29, wherein said data relating to said motion image data is one of said parallax image data, and data relating to said motion image data and said point-of-regard, and data relating to said parallax image data, said motion image data and said point-of-regard.

32. A communication terminal device comprising:

motion image input means for inputting motion image data;

point-of-regard setting means for setting at least one frame as a reference frame in a plurality of frames that constitute the motion image data, and a point-of-regard on an object in said reference frame;

motion compensation processing means for calculating an amount of movement of said point-of-regard using a relation between the point-of-regard in said reference frame and a point corresponding thereto in another frame, calculating a motion compensation amount for each frame based on said amount of movement, and executing a motion compensation processing for said motion image data based on said motion compensation amount;

a supplier for supplying an output of said motion compensation processing means to an image processing means, said image processing means being operable to convert said motion image data to parallax image data for printing printed as parallax image printed matter in which a perceived image varies depending on a viewing angle; and communication means for transmitting data relating to said motion image data, whereby frame-based motion image data is converted to parallax printing data according to frame-to-frame motion compensation data.

* * * * *